US012602398B2

(12) United States Patent
Zipris et al.

(10) Patent No.: US 12,602,398 B2
(45) Date of Patent: Apr. 14, 2026

(54) SYNCHRONIZING STATE IN LARGE-SCALE DISTRIBUTION SYSTEMS

(71) Applicant: eBay Inc., San Jose, CA (US)

(72) Inventors: Idan Zipris, Tel Aviv (IL); Yan Gleyzer, Petah Tikva (IL); Rami Yagil, Hadera (IL); Guy Rozenwald, Tel-Mond (DE)

(73) Assignee: EBAY INC., San Jose, CA (US)

( * ) Notice: Subject to any disclaimer, the term of this patent is extended or adjusted under 35 U.S.C. 154(b) by 168 days.

(21) Appl. No.: 18/211,512

(22) Filed: Jun. 19, 2023

(65) Prior Publication Data

US 2024/0419683 A1     Dec. 19, 2024

(51) Int. Cl.
*G06F 16/00* (2019.01)
*G06F 1/12* (2006.01)
(Continued)

(52) U.S. Cl.
CPC ................ *G06F 16/27* (2019.01); *G06F 1/12* (2013.01); *G06Q 30/0283* (2013.01); *G06Q 30/06* (2013.01)

(58) Field of Classification Search
None
See application file for complete search history.

(56) References Cited

U.S. PATENT DOCUMENTS 6,477,545 B1 * 11/2002 LaRue ..................... G06F 16/27
                                                    707/625
6,810,405 B1 * 10/2004 LaRue .................. A61M 19/00
                                                    707/621
(Continued)

FOREIGN PATENT DOCUMENTS

EP       3465477 B1     5/2022

OTHER PUBLICATIONS

Amazon Web Services, Caching Best Practices, Aug. 8, 2020, Retrieved from https://web.archive.org/web/20200808074853/https://aws.amazon.com/caching/best-practices/, 9 pages.
Huang et al., ROP: Alleviating Refresh Overheads Via Reviving the Memory System in Frozen Cycles, 2016 45th International Conference on Parallel Processing, Sep. 22, 2016, Retrieved from https://ieeexplore.ieee.org/abstract/document/7573815.
Oracle, Coherence Developer's Guide: 13 Read-Through, Write-Through, Write-Behind, and refresh-Ahead Caching, Nov. 20, 2012, retrieved from: https://web.archive.org/web/20121120060300/https://docs.oracle.com/cd/E15357_01/coh.360/e15723/cache_rtwtwbra.htm, 12 pages.

(Continued)

*Primary Examiner* — Hasanul Mobin
(74) *Attorney, Agent, or Firm* — SCHWEGMAN LUNDBERG & WOESSNER, P.A.

(57) ABSTRACT

A processing client may receive a dataset replacement indication that indicates an upcoming synchronized data replacement in which processing clients are to synchronously replace a first synchronized dataset with a second synchronized dataset as well as a request period during which the processing clients are to request, at randomized times, the second synchronized dataset. The processing client may transmit a query requesting the second synchronized dataset. The processing client may receive a response including the second synchronized dataset and an indication of an expiration time for the first synchronized dataset that indicates when the processing clients are to replace the first synchronized dataset. The processing client may store, at the processing client prior to the expiration time, the second synchronized dataset and the indication of the expiration time. The processing client may replace, in response to the expiration time occurring, the first synchronized dataset with the second synchronized dataset.

20 Claims, 10 Drawing Sheets

(51) Int. Cl.
  *G06F 16/27*       (2019.01)
  *G06Q 30/0283*     (2023.01)
  *G06Q 30/06*       (2023.01)

(56)                References Cited

U.S. PATENT DOCUMENTS

| | | | | |
|---|---|---|---|---|
| 10,380,339 | B1 * | 8/2019 | Appalaraju | G06F 21/577 |
| 10,397,590 | B2 * | 8/2019 | Cohen | H04N 19/40 |
| 10,489,592 | B1 * | 11/2019 | Naamneh | G06F 12/1441 |
| 11,216,581 | B1 * | 1/2022 | Arikapudi | G06F 21/31 |
| 11,379,375 | B1 | 7/2022 | Gottin et al. | |
| 11,423,026 | B2 * | 8/2022 | Balasubrahmanian | G06F 16/2379 |
| 11,468,421 | B1 * | 10/2022 | Maselli | G06Q 20/207 |
| 2002/0184448 | A1 | 12/2002 | Cherkasova et al. | |
| 2006/0155933 | A1 | 7/2006 | Buyuktosunoglu et al. | |
| 2007/0130463 | A1 * | 6/2007 | Law | G06F 21/34 713/168 |
| 2007/0150370 | A1 * | 6/2007 | Staib | G06Q 30/0641 705/26.81 |
| 2008/0229025 | A1 | 9/2008 | Plamondon | |
| 2009/0077263 | A1 * | 3/2009 | Koganti | H04L 67/1095 709/248 |
| 2011/0315778 | A1 * | 12/2011 | Krupp | B28B 7/00 235/492 |
| 2013/0290470 | A1 * | 10/2013 | CaraDonna | G06F 16/211 709/214 |
| 2013/0304700 | A1 * | 11/2013 | Nicklin | G06F 16/275 707/624 |
| 2013/0311909 | A1 * | 11/2013 | Howard | G06F 3/04847 715/760 |
| 2016/0071174 | A1 * | 3/2016 | McGilliard | G06Q 30/0601 705/26.1 |
| 2016/0217027 | A1 * | 7/2016 | Chauvet | G06F 3/068 |
| 2016/0232560 | A1 * | 8/2016 | VanDeVelde | G06Q 30/0238 |
| 2016/0378343 | A1 * | 12/2016 | Long | G06F 3/0659 711/103 |
| 2017/0046081 | A1 * | 2/2017 | Palmer | G06F 3/065 |
| 2017/0324986 | A1 | 11/2017 | Gay et al. | |
| 2018/0069946 | A1 | 3/2018 | Katsev | |
| 2018/0260125 | A1 * | 9/2018 | Botes | G06F 3/0635 |
| 2019/0187689 | A1 * | 6/2019 | Cella | G06N 5/046 |
| 2019/0339687 | A1 * | 11/2019 | Cella | G06F 3/067 |
| 2020/0104507 | A1 * | 4/2020 | Kasper | G06F 21/577 |
| 2021/0224696 | A1 * | 7/2021 | Nasr-Azadani | G06N 5/01 |
| 2021/0374523 | A1 | 12/2021 | Gottin et al. | |
| 2022/0050858 | A1 * | 2/2022 | Karr | G06F 11/3466 |
| 2023/0195696 | A1 * | 6/2023 | Gentric | G06F 16/178 707/610 |
| 2024/0126411 | A1 * | 4/2024 | Meyrignac | G06F 16/635 |

OTHER PUBLICATIONS

Sven Bayer, Accelerate Microservices with Refresh—Ahead Caching, Sep. 30, 2018, Retrieved from https://svenbayer.blog/2018/09/30/accelerate-microservices-with-refresh-ahead-caching/.

"European Application Serial No. 24180952.4, Extended European Search Report mailed Nov. 13, 2024", 10 pgs.

"Automatically reload a webpage when it expires", [Online]. Retrieved from the Internet: URL: https: stackoverflow.com questions 64242485 automatically-reload-a-webpage-when-it-expires, (Dec. 17, 2022), 3 pgs.

"Caching Patterns Boosting Your Application's Performance and Scalability", [Online]. Retrieved from the Internet: URL: https: www.linkedin.com pulse caching-patterns-boosting-yourapplications-performance, (Mar. 16, 2023), 11 pgs.

Matthew, Neale, "Randomisation of cache durations reduces peak load variance on origin systems", [Online]. Retrieved from the Internet: URL: https: web.archive.org web 20150114002524if_ http : www.estaronline.com images assetimages EstarOnline_Randomisation_Of_Cache_Periods.pdf, (Jan. 14, 2015), 5 pgs.

Mehojah, Kayla, "How to Prevent a Cache Stampede", [Online]. Retrieved from the Internet: URL: https: web.archive.org web 20230607042516 https: wpvip.com Jun. 7, 2023 wordpress-caching , (Jun. 7, 2023), 11 pgs.

"European Application Serial No. 24180952.4, Response filed Mar. 27, 2025 to Extended European Search Report mailed Nov. 13, 2024", 13 pgs.

"European Application Serial No. 24180952.4, Communication Pursuant to Article 943 EPC mailed Sep. 2, 2025", 8 pgs.

* cited by examiner

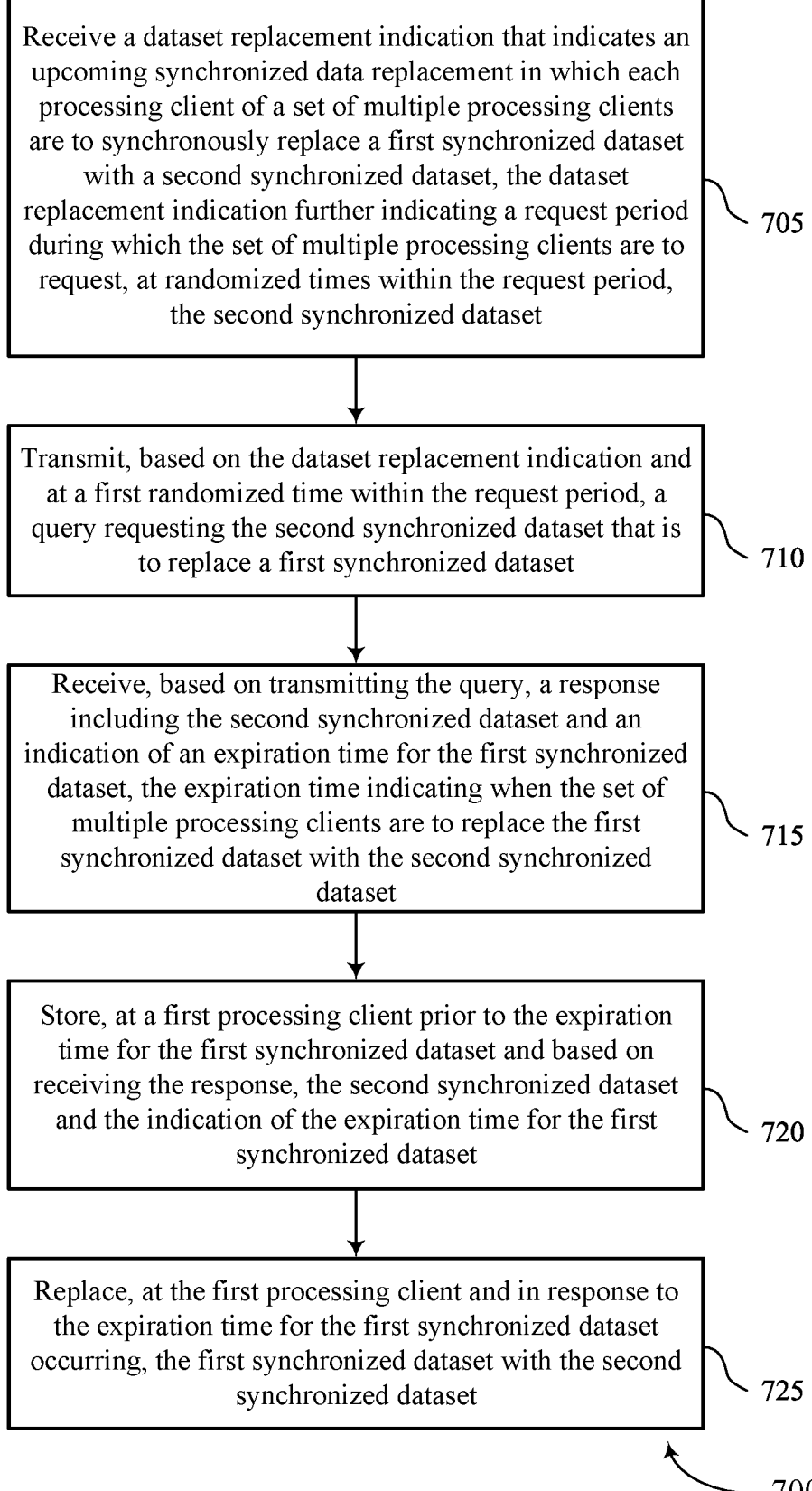

Receive a dataset replacement indication that indicates an upcoming synchronized data replacement in which each processing client of a set of multiple processing clients are to synchronously replace a first synchronized dataset with a second synchronized dataset, the dataset replacement indication further indicating a request period during which the set of multiple processing clients are to request, at randomized times within the request period, the second synchronized dataset

705

Transmit, based on the dataset replacement indication and at a first randomized time within the request period, a query requesting the second synchronized dataset that is to replace a first synchronized dataset

710

Receive, based on transmitting the query, a response including the second synchronized dataset and an indication of an expiration time for the first synchronized dataset, the expiration time indicating when the set of multiple processing clients are to replace the first synchronized dataset with the second synchronized dataset

715

Store, at a first processing client prior to the expiration time for the first synchronized dataset and based on receiving the response, the second synchronized dataset and the indication of the expiration time for the first synchronized dataset

720

Replace, at the first processing client and in response to the expiration time for the first synchronized dataset occurring, the first synchronized dataset with the second synchronized dataset

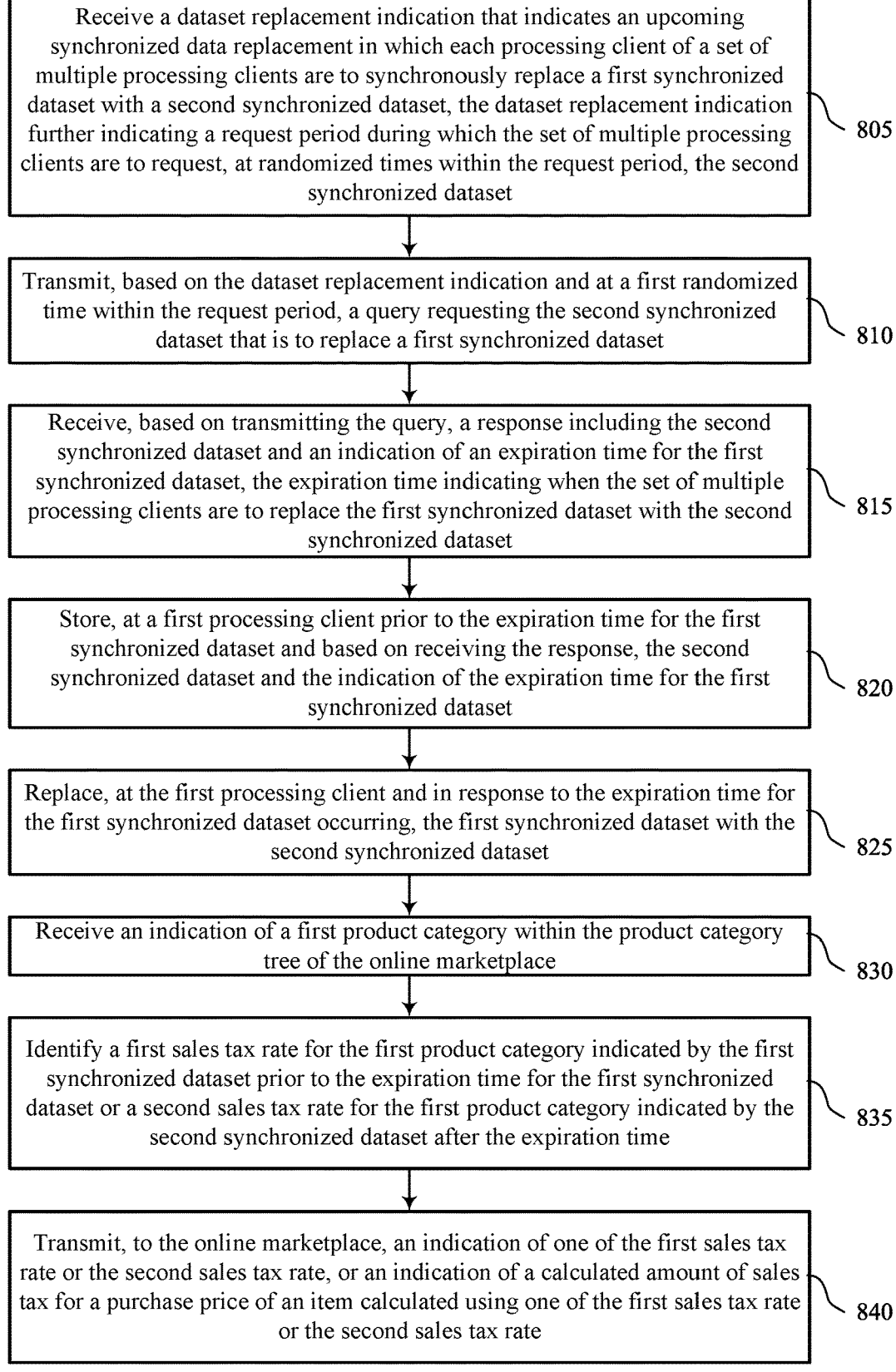

Receive a dataset replacement indication that indicates an upcoming synchronized data replacement in which each processing client of a set of multiple processing clients are to synchronously replace a first synchronized dataset with a second synchronized dataset, the dataset replacement indication further indicating a request period during which the set of multiple processing clients are to request, at randomized times within the request period, the second synchronized dataset

805

Transmit, based on the dataset replacement indication and at a first randomized time within the request period, a query requesting the second synchronized dataset that is to replace a first synchronized dataset

810

Receive, based on transmitting the query, a response including the second synchronized dataset and an indication of an expiration time for the first synchronized dataset, the expiration time indicating when the set of multiple processing clients are to replace the first synchronized dataset with the second synchronized dataset

815

Store, at a first processing client prior to the expiration time for the first synchronized dataset and based on receiving the response, the second synchronized dataset and the indication of the expiration time for the first synchronized dataset

820

Replace, at the first processing client and in response to the expiration time for the first synchronized dataset occurring, the first synchronized dataset with the second synchronized dataset

825

Receive an indication of a first product category within the product category tree of the online marketplace

830

Identify a first sales tax rate for the first product category indicated by the first synchronized dataset prior to the expiration time for the first synchronized dataset or a second sales tax rate for the first product category indicated by the second synchronized dataset after the expiration time

835

Transmit, to the online marketplace, an indication of one of the first sales tax rate or the second sales tax rate, or an indication of a calculated amount of sales tax for a purchase price of an item calculated using one of the first sales tax rate or the second sales tax rate

Receive a dataset replacement indication that indicates an upcoming synchronized data replacement in which each processing client of a set of multiple processing clients are to synchronously replace a first synchronized dataset with a second synchronized dataset, the dataset replacement indication further indicating a request period during which the set of multiple processing clients are to request, at randomized times within the request period, the second synchronized dataset    905

Transmit, based on the dataset replacement indication and at a first randomized time within the request period, a query requesting the second synchronized dataset that is to replace a first synchronized dataset    910

Receive, based on transmitting the query, a response including the second synchronized dataset and an indication of an expiration time for the first synchronized dataset, the expiration time indicating when the set of multiple processing clients are to replace the first synchronized dataset with the second synchronized dataset    915

Store, at a first processing client prior to the expiration time for the first synchronized dataset and based on receiving the response, the second synchronized dataset and the indication of the expiration time for the first synchronized dataset    920

Replace, at the first processing client and in response to the expiration time for the first synchronized dataset occurring, the first synchronized dataset with the second synchronized dataset    925

Receive an indication of a product available from the online marketplace    930

Identify in which product category of a set of multiple product categories of the product category tree the product is classified using one of the first synchronized dataset prior to the expiration time for the first synchronized dataset or the second synchronized dataset after the expiration time    935

Transmit, to the online marketplace, an indication of the identified product category or data associated with the identified product category    940

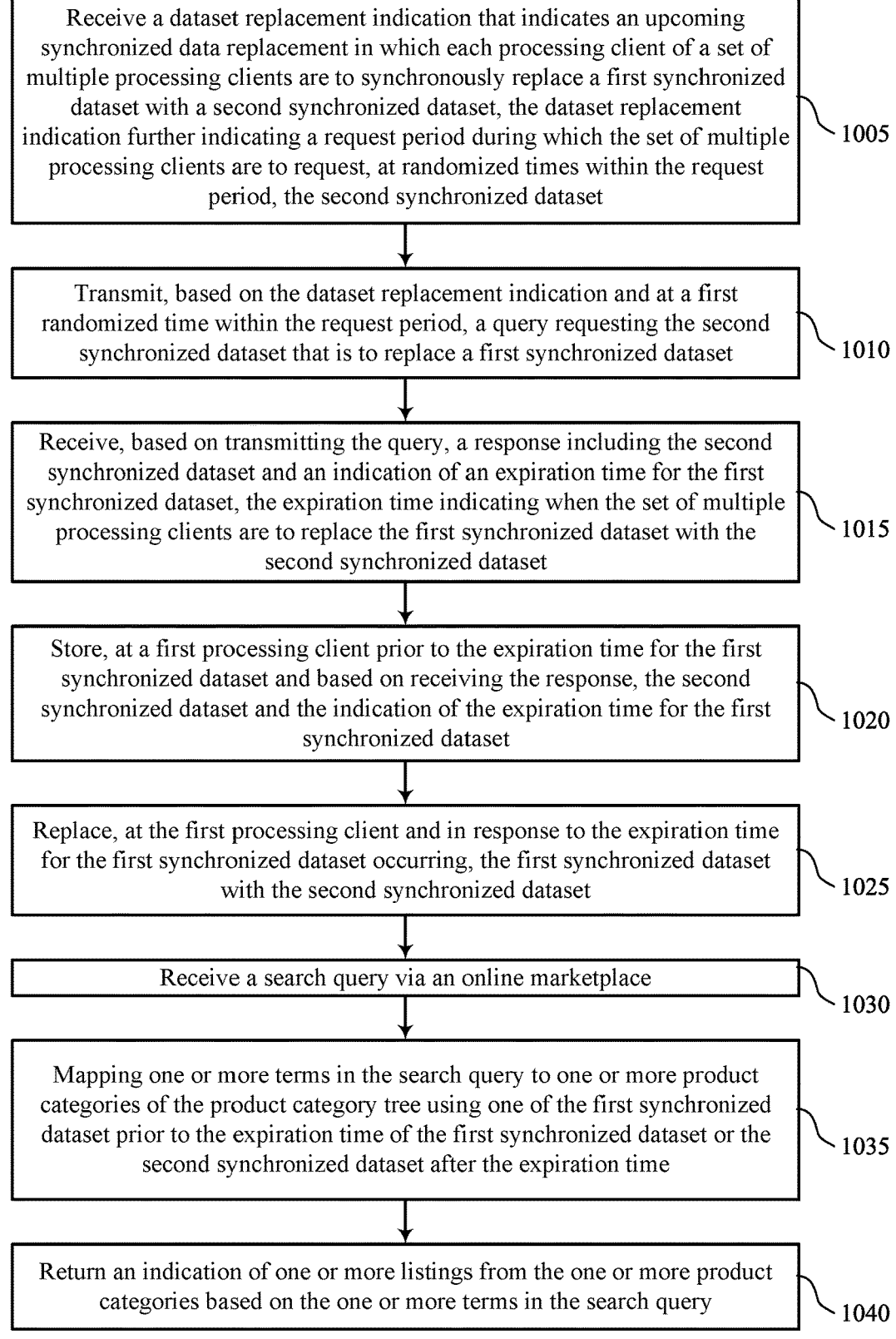

Receive a dataset replacement indication that indicates an upcoming synchronized data replacement in which each processing client of a set of multiple processing clients are to synchronously replace a first synchronized dataset with a second synchronized dataset, the dataset replacement indication further indicating a request period during which the set of multiple processing clients are to request, at randomized times within the request period, the second synchronized dataset ⟍ 1005

Transmit, based on the dataset replacement indication and at a first randomized time within the request period, a query requesting the second synchronized dataset that is to replace a first synchronized dataset ⟍ 1010

Receive, based on transmitting the query, a response including the second synchronized dataset and an indication of an expiration time for the first synchronized dataset, the expiration time indicating when the set of multiple processing clients are to replace the first synchronized dataset with the second synchronized dataset ⟍ 1015

Store, at a first processing client prior to the expiration time for the first synchronized dataset and based on receiving the response, the second synchronized dataset and the indication of the expiration time for the first synchronized dataset ⟍ 1020

Replace, at the first processing client and in response to the expiration time for the first synchronized dataset occurring, the first synchronized dataset with the second synchronized dataset ⟍ 1025

Receive a search query via an online marketplace ⟍ 1030

Mapping one or more terms in the search query to one or more product categories of the product category tree using one of the first synchronized dataset prior to the expiration time of the first synchronized dataset or the second synchronized dataset after the expiration time ⟍ 1035

Return an indication of one or more listings from the one or more product categories based on the one or more terms in the search query ⟍ 1040

FIG. 10    ⟍ 1000

SYNCHRONIZING STATE IN LARGE-SCALE DISTRIBUTION SYSTEMS

FIELD OF TECHNOLOGY

The present disclosure relates generally to database systems and data processing, and more specifically to synchronizing state in large-scale distribution systems.

BACKGROUND

An online marketplace or other data processing system may distribute datasets across multiple services which may rely upon the datasets being consistent across the multiple services. Some data processing systems may update these datasets, incurring substantial loads on the data processing system to update such datasets across the various services or clients. However, such approaches may be improved.

SUMMARY

A method for synchronized data replacement is described. The method may include receiving a dataset replacement indication that indicates an upcoming synchronized data replacement in which each processing client of a set of multiple processing clients are to synchronously replace a first synchronized dataset with a second synchronized dataset, the dataset replacement indication further indicating a request period during which the set of multiple processing clients are to request, at randomized times within the request period, the second synchronized dataset, transmitting, based on the dataset replacement indication and at a first randomized time within the request period, a query requesting the second synchronized dataset that is to replace the first synchronized dataset, receiving, based on transmitting the query, a response including the second synchronized dataset and an indication of an expiration time for the first synchronized dataset, the expiration time indicating when the set of multiple processing clients are to replace the first synchronized dataset with the second synchronized dataset, storing, at a first processing client prior to the expiration time for the first synchronized dataset and based on receiving the response, the second synchronized dataset and the indication of the expiration time for the first synchronized dataset, and replacing, at the first processing client and in response to the expiration time for the first synchronized dataset occurring, the first synchronized dataset with the second synchronized dataset.

An apparatus for synchronized data replacement is described. The apparatus may include at least one processor, at least one memory coupled with the at least one processor, and instructions stored in the at least one memory. The instructions may be executable by the at least one processor to cause the apparatus to receive a dataset replacement indication that indicates an upcoming synchronized data replacement in which each processing client of a set of multiple processing clients are to synchronously replace a first synchronized dataset with a second synchronized dataset, the dataset replacement indication further indicating a request period during which the set of multiple processing clients are to request, at randomized times within the request period, the second synchronized dataset, transmit, based on the dataset replacement indication and at a first randomized time within the request period, a query requesting the second synchronized dataset that is to replace the first synchronized dataset, receive, based on transmitting the query, a response including the second synchronized dataset and an indication of an expiration time for the first synchronized dataset, the expiration time indicating when the set of multiple processing clients are to replace the first synchronized dataset with the second synchronized dataset, store, at a first processing client prior to the expiration time for the first synchronized dataset and based on receiving the response, the second synchronized dataset and the indication of the expiration time for the first synchronized dataset, and replace, at the first processing client and in response to the expiration time for the first synchronized dataset occurring, the first synchronized dataset with the second synchronized dataset.

Another apparatus for synchronized data replacement is described. The apparatus may include means for receiving a dataset replacement indication that indicates an upcoming synchronized data replacement in which each processing client of a set of multiple processing clients are to synchronously replace a first synchronized dataset with a second synchronized dataset, the dataset replacement indication further indicating a request period during which the set of multiple processing clients are to request, at randomized times within the request period, the second synchronized dataset, means for transmitting, based on the dataset replacement indication and at a first randomized time within the request period, a query requesting the second synchronized dataset that is to replace the first synchronized dataset, means for receiving, based on transmitting the query, a response including the second synchronized dataset and an indication of an expiration time for the first synchronized dataset, the expiration time indicating when the set of multiple processing clients are to replace the first synchronized dataset with the second synchronized dataset, means for storing, at a first processing client prior to the expiration time for the first synchronized dataset and based on receiving the response, the second synchronized dataset and the indication of the expiration time for the first synchronized dataset, and means for replacing, at the first processing client and in response to the expiration time for the first synchronized dataset occurring, the first synchronized dataset with the second synchronized dataset.

A non-transitory computer-readable medium storing code for synchronized data replacement is described. The code may include instructions executable by a processor to receive a dataset replacement indication that indicates an upcoming synchronized data replacement in which each processing client of a set of multiple processing clients are to synchronously replace a first synchronized dataset with a second synchronized dataset, the dataset replacement indication further indicating a request period during which the set of multiple processing clients are to request, at randomized times within the request period, the second synchronized dataset, transmit, based on the dataset replacement indication and at a first randomized time within the request period, a query requesting the second synchronized dataset that is to replace the first synchronized dataset, receive, based on transmitting the query, a response including the second synchronized dataset and an indication of an expiration time for the first synchronized dataset, the expiration time indicating when the set of multiple processing clients are to replace the first synchronized dataset with the second synchronized dataset, store, at a first processing client prior to the expiration time for the first synchronized dataset and based on receiving the response, the second synchronized dataset and the indication of the expiration time for the first synchronized dataset, and replace, at the first processing client and in response to the expiration time for the first synchronized dataset occurring, the first synchronized dataset with the second synchronized dataset.

In some examples of the method, apparatuses, and non-transitory computer-readable medium described herein, the first synchronized dataset and the second synchronized dataset each describe a product category tree of an online marketplace and a set of multiple sales tax rates for respective product categories of the product category tree and the method, apparatuses, and non-transitory computer-readable medium may include further operations, features, means, or instructions for receiving an indication of a first product category within the product category tree of the online marketplace, identifying a first sales tax rate for the first product category indicated by the first synchronized dataset prior to the expiration time for the first synchronized dataset or a second sales tax rate for the first product category indicated by the second synchronized dataset after the expiration time, and transmitting, to the online marketplace, an indication of one of the first sales tax rate or the second sales tax rate, or an indication of a calculated amount of sales tax for a purchase price of an item calculated using one of the first sales tax rate or the second sales tax rate.

In some examples of the method, apparatuses, and non-transitory computer-readable medium described herein, the first synchronized dataset describes a product category tree having a first category structure for an online marketplace and the second synchronized dataset describes the product category tree having a second category structure that differs from the first category structure and the method, apparatuses, and non-transitory computer-readable medium may include further operations, features, means, or instructions for receiving an indication of a product available from the online marketplace, identifying in which product category of a set of multiple product categories of the product category tree the product may be classified using one of the first synchronized dataset prior to the expiration time for the first synchronized dataset or the second synchronized dataset after the expiration time, and transmitting, to the online marketplace, an indication of the identified product category or data associated with the identified product category.

In some examples of the method, apparatuses, and non-transitory computer-readable medium described herein, the data indicates a sales tax rate for products categorized within the identified product category, a geo-location to which the online marketplace ships products categorized within the identified product category, a delivery estimate for products categorized within the identified product category, a shipping cost estimate for products categorized within the identified product category, or any combination thereof.

In some examples of the method, apparatuses, and non-transitory computer-readable medium described herein, the first synchronized dataset describes a product category tree having a first category structure for an online marketplace and the second synchronized dataset describes the product category tree having a second category structure that differs from the first category structure and the method, apparatuses, and non-transitory computer-readable medium may include further operations, features, means, or instructions for receiving a search query via an online marketplace, mapping one or more terms in the search query to one or more product categories of the product category tree using one of the first synchronized dataset prior to the expiration time of the first synchronized dataset or the second synchronized dataset after the expiration time, and returning an indication of one or more listings from the one or more product categories based on the one or more terms in the search query.

In some examples of the method, apparatuses, and non-transitory computer-readable medium described herein, periodically transmitting one or more additional queries requesting one or more additional synchronized datasets and monitoring for one or more responses to the one or more additional queries.

In some examples of the method, apparatuses, and non-transitory computer-readable medium described herein, the first synchronized dataset describes a product category tree associated with an online marketplace and the second synchronized dataset describes a modified version of the product category tree.

In some examples of the method, apparatuses, and non-transitory computer-readable medium described herein, the first synchronized dataset describes online marketplace metadata associated with an online marketplace and the second synchronized dataset describes a modified version of the online marketplace metadata.

Some examples of the method, apparatuses, and non-transitory computer-readable medium described herein may further include operations, features, means, or instructions for synchronizing a clock of the first processing client with one or more additional clocks associated with one or more second processing clients of the set of multiple processing clients.

In some examples of the method, apparatuses, and non-transitory computer-readable medium described herein, replacing the first synchronized dataset with the second synchronized dataset may include operations, features, means, or instructions for adjusting at least one pointer in memory implemented by a storage device from the first synchronized dataset to the second synchronized dataset.

BRIEF DESCRIPTION OF THE DRAWINGS

FIGS. 7 through 10 show flowcharts illustrating methods that support synchronizing state in large-scale distribution systems in accordance with examples as disclosed herein.

DETAILED DESCRIPTION

Figure 1:
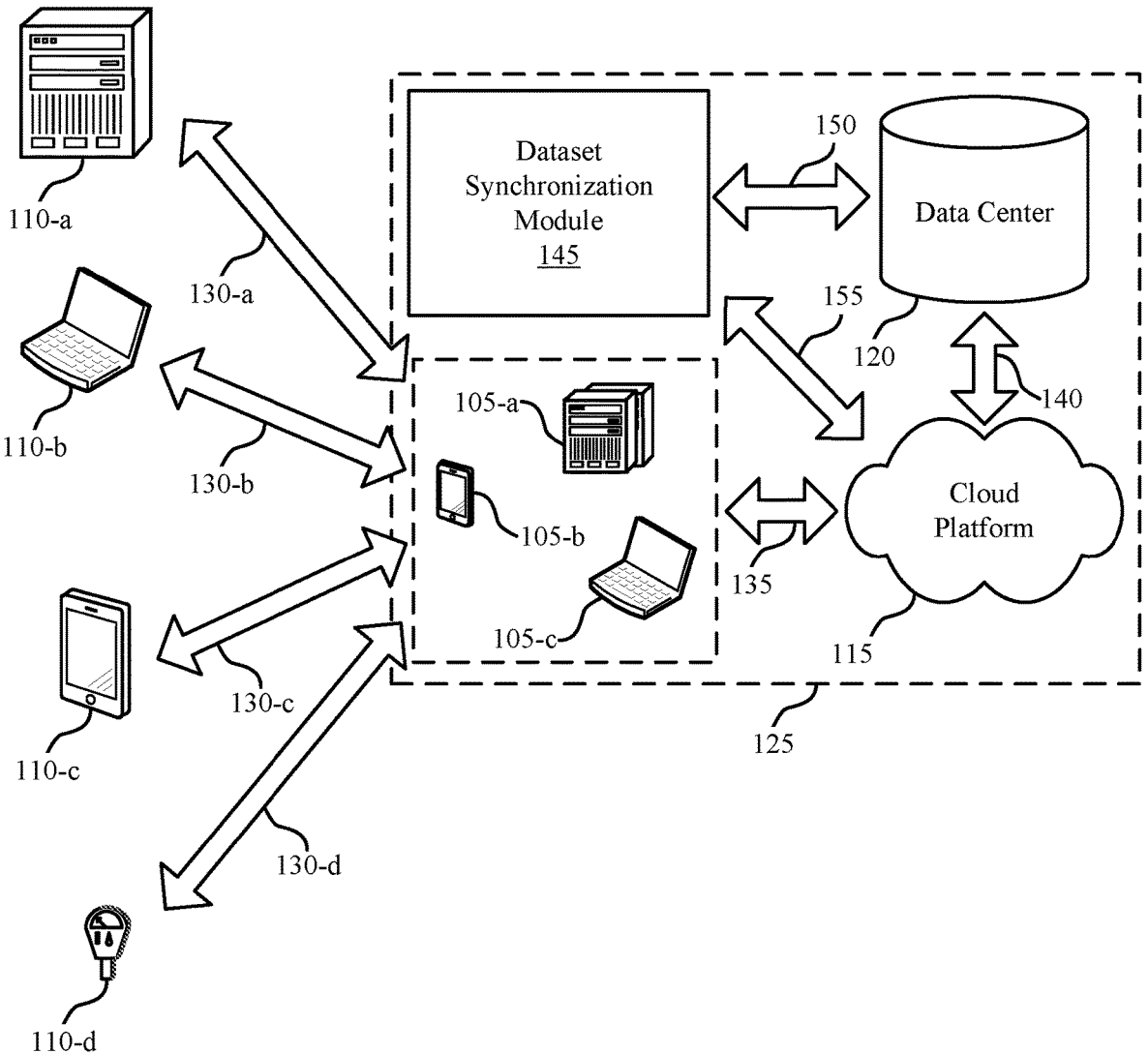
FIG. 1 illustrates an example of a data processing system that supports synchronizing state in large-scale distribution systems in accordance with examples as disclosed herein.

In some data processing systems, datasets may be distributed across multiple services or clients. In small data processing systems, updates to the datasets may be transmitted to the multiple services or clients within a reasonable amount of time and maintaining a reasonable level of synchronization across the services or clients. However, when such data processing systems include large quantities of services or clients, it becomes difficult to update the datasets across the processing system in a synchronized manner, as datasets at many different services or clients is to be updated. If they are not all updated at the same time or within a certain amount of time, data synchronization across the services or clients is lost, as different services or clients may operate with different versions of the dataset, leading to data inconsistency, errors, incorrect information, or other problems. Further, simply attempting to update large quantities of processing clients in the same manner as updating small quantities of processing clients introduces problems not present in small quantity scenarios. For example, updating the datasets by simply instructing the processing clients to query for updated datasets at once, may incur significant loads (e.g., processing loads, communication loads, storage loads, or other loads) on the data processing system as the various services or clients may transmit overlapping queries, excessively burdening those elements of the system that provide the updated dataset, slowing processing speeds, degrading user experience, causing service interruptions and communication spikes, and failing to maintain synchronization of the data processing system.

The techniques described herein involve synchronization of a shared or common dataset across multiple services or processing clients. The multiple processing clients may receive an indication of a request period during which the multiple process clients are to query a data source to request an updated dataset (e.g., a second dataset that is to replace a first dataset) at one or more random times throughout the request period, which may be determined in a variety of ways. The indication of the request period may further include information or indications that may be used by individual processing clients to determine the one or more random times within the request period at which the individual processing clients are to transmit respective queries for the second dataset.

In response to the one or more queries transmitted at random times, the processing client receives the updated dataset and an indication of an expiration time at which the dataset (e.g., the "old" dataset that is to be replaced) expires and is no longer valid or is no longer to be used. Additionally, or alternatively, the processing client may receive an indication of an effective time at which the updated dataset is to be effective or valid may be provided to the data source (e.g., by an administrator). This updated data is received by the client before the effective time. Thus, in response to arriving at the effective time, the client may then replace the existing/prior data with the future/updated data with little or no delay.

As such, the subject matter described herein reduces and resolves the problems present in previous approaches used for updating data across multiple entities. For example, by spreading out the queries from the various services or clients throughout the request period (e.g., at randomized times, which may be determined by one or more methods as described here), the load on the system may be reduced, as it is not attempting to serve too many clients or services at once. Traffic spikes may be reduced or avoided, and traffic associated with dataset updates is more consistent. Further, synchronization of the updated dataset between the services or clients is maintained. Even though the services or clients transmit respective queries at different, randomized times, they all request the updated dataset within the request period or at least before the expiration time. Thus, synchronization may be improved, as, in response to arriving at the expiration time, the processing clients already have the data stored and can swap the dataset substantially simultaneously. Further, the issue of synchronization between the clients in this manner reduces the complexity of the synchronization in that the timing of the synchronization does not depend on the various processing times, communication times, environments, and other variables, and instead involves clock synchronization across the processing entities. Further, the subject matter described herein allows for scaling of dataset replacement synchronization or state synchronization across large quantities of clients that is difficult or impossible using other approaches.

Aspects of the disclosure are initially described in the context of an environment supporting an on-demand database service. Aspects of the disclosure are then described with reference to process flows. Aspects of the disclosure are further illustrated by and described with reference to apparatus diagrams, system diagrams, and flowcharts that relate to synchronizing state in large-scale distribution systems.

FIG. 1 illustrates an example of a system 100 for cloud computing that supports synchronizing state in large-scale distribution systems in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. In some cases, cloud platform 115 may support online marketplace solutions. This may include support for creation and publishing of listings, seller management, search queries for products, product categorization, purchasing functions for buyers, one or more other online marketplace functions, or any combination thereof. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120. In some examples, the subsystem 125 may be associated with an online marketplace. For example, one or more elements of the subsystem 125 may perform operations associated with the online marketplace.

In some aspects, the system 100 may be configured to synchronize the states of one or more datasets across clients 105 or services of the system 100. According to techniques described herein, the system 100 may include the dataset synchronization module 145 which is configured to synchronize updating or replacement of datasets across large quantities of processing clients. Such processing clients may be the cloud clients 105, the contacts 110, the cloud platform 115, the data center 120, another element of the system 100, or any combination thereof. Additionally, or alternatively, the processing clients may be independent or "stand-alone" elements of the system 100 (e.g., not included in other elements of the system). The dataset synchronization module 145 may communicate with cloud platform 115 via connection 155 and may also communicate with data center 120 via connection 150. The dataset synchronization module 145 may receive signals and inputs from contacts 110 via cloud clients 105 and via cloud platform 115 or data center 120. In some aspects, the dataset synchronization module 145 may include one or more servers.

The dataset synchronization module 145 may manage synchronization of dataset replacement cross large quantities of services or processing clients of the system 100. For example, the dataset synchronization module 145 may transmit a dataset replacement indication that may indicate that the processing clients are to replace a first dataset with second dataset at a future time and that the processing clients are to query the dataset synchronization module 145 at randomized times within a request window to receive the updated or replacement dataset. The processing clients, at respective randomized times (which may be determined using one or more techniques as described herein), may transmit respective queries to the dataset synchronization module 145, which may in turn transmit the updated dataset back to the processing entities in response to the queries. This process may occur for each of the processing entities that are to update the dataset, and this may all occur at least partially during the request period, prior to the expiration time of the "old" dataset that is to be updated (or the effective time of the updated dataset that is to replace the "old" dataset). In this way, the queries and corresponding responses may be distributed at least partially throughout the request period to reduce the burden on the dataset synchronization module 145 or other elements of the system 100. In response to arriving at the expiration or effective time, the processing clients may update or replace the "old" dataset with the "new" or updated dataset in a substantially synchronized manner.

In some examples, the dataset synchronization module 145 may manage synchronization of clocks of the processing clients so that the processing clients, after having received the updated dataset, may replace the "old" dataset in a substantially synchronized manner. In some examples, some processing clients may perform operations associated with aspects of online marketplace operations, including sales tax determination, product category determination, shipping cost determination, search query operations, or other online marketplace operations, including transmission of determined information. In some examples, the datasets may include metadata associated with the online marketplace.

It should be appreciated by a person skilled in the art that one or more aspects of the disclosure may be implemented in a system 100 to, additionally, or alternatively, solve other problems than those described herein. Furthermore, aspects of the disclosure may provide technical improvements to "conventional" systems or processes as described herein. However, the description and appended drawings include example technical improvements resulting from implementing aspects of the disclosure, and accordingly do not represent all of the technical improvements provided within the scope of the claims.

Figure 2:
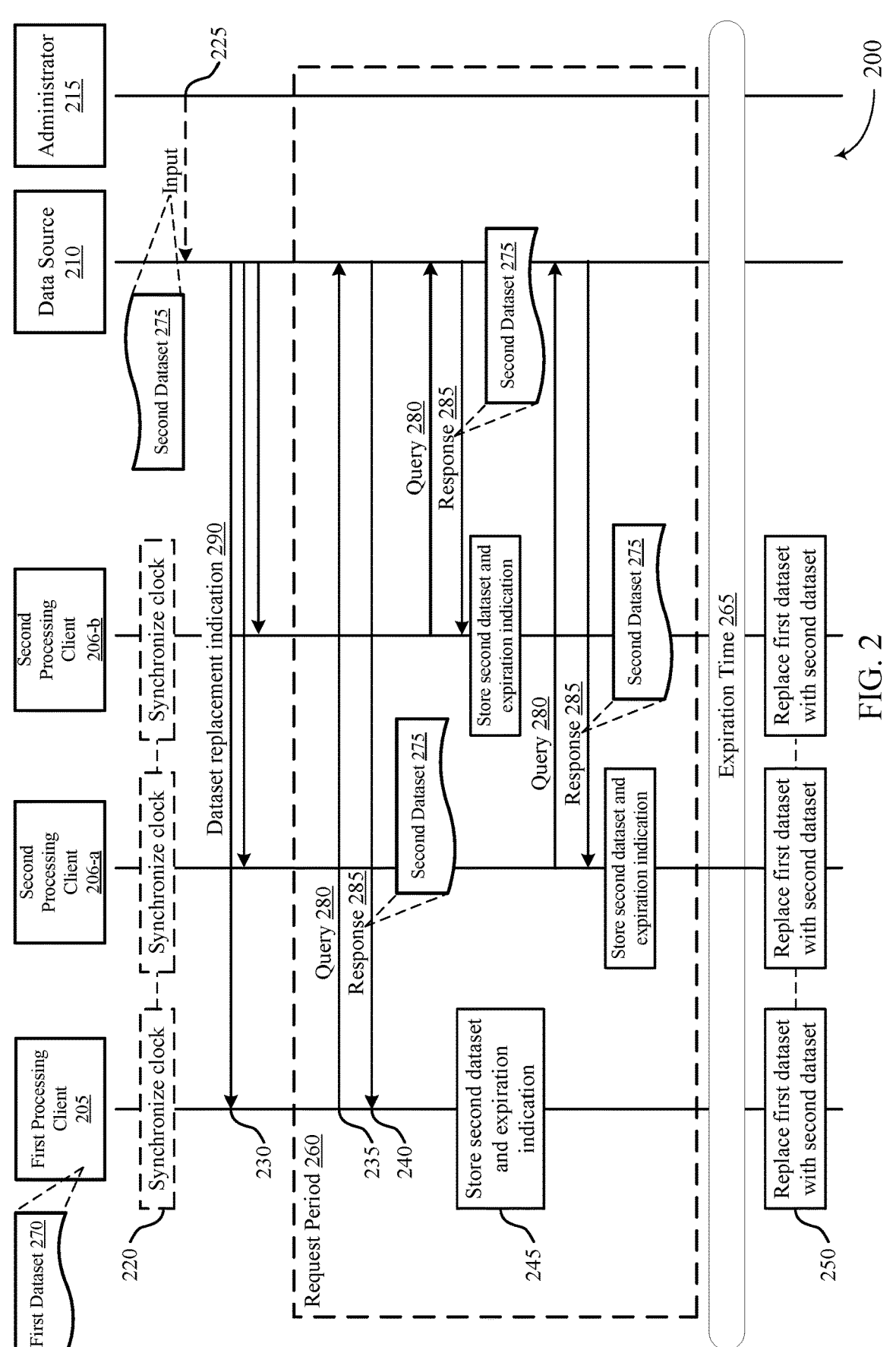
FIG. 2 shows an example of a process flow that supports synchronizing state in large-scale distribution systems in accordance with examples as disclosed herein.

FIG. 2 shows an example of a process flow 200 that supports synchronizing state in large-scale distribution systems in accordance with examples as disclosed herein. The process flow 200 may implement various aspects of the present disclosure described herein. The elements described in the process flow 200 (e.g., first processing client 205, second processing clients 206, data source 210, and administrator 215) may be examples of similarly-named elements described herein. Though only the first processing client 205 and the second processing clients 206 are depicted here, the operations described here that are performed by the first processing client 205 and the second processing clients 206 may be performed by any quantity of processing clients, thereby providing the advantages of the subject matter described herein as compared to other approaches. Cloud clients 105 and contacts 110 are examples of processing clients 205 and 206). The limited quantity of processing clients depicted in FIG. 2 is included for clarity and to provide non-limiting examples.

In the following description of the process flow 200, the operations between the various entities or elements may be performed in different orders or at different times. Some operations may also be left out of the process flow 200, or other operations may be added. Although the various entities or elements are shown performing the operations of the process flow 200, some aspects of some operations may also be performed by other entities or elements of the process flow 200 or by entities or elements that are not depicted in the process flow, or any combination thereof.

At 220, the first processing client 205 may synchronize a clock of the first processing client with one or more additional clocks associated with one or more second processing clients of the plurality of processing clients. In some cases, synchronization of clocks across the first processing client 205 and the second processing clients 206 may be performed across different datacenters that may be found in different physical locations. For example, the first processing client 205 may be operated from or associated with a first datacenter and the second processing clients 206 may be operated in or associated with one or more second datacenters. As such, the clock synchronization may be performed across these different datacenters. In some examples, the clock synchronization may be performed to maintain timing differences between processing clients below a clock synchronization or timing threshold (e.g., 50 ms, 100 ms, 200 ms, 500 ms, 1 s, 10 s, 30 s or another threshold amount of time).

At 225, the data source 210 may receive (e.g., from the administrator 215) input indicating the second synchronized dataset and the expiration time. For example, the administrator 215 may be a human user providing input. Additionally, or alternatively, the administrator 215 may be a service associated with the data processing system that manages state synchronization or replacement of the first dataset 270 with the second dataset 275. For example, the administrator 215 may transmit the input to the data source 210 periodically, aperiodically, or on demand. The input may include the second dataset 275, an indication of the expiration time 265 for the second dataset 275 (which may be alternatively expressed as an effective time of the second dataset 275), any or all of the information transmitted in the dataset replacement indication 290, other information associated with replacement of the first dataset 270 with the second dataset 275, or any combination thereof.

At 230, the first processing client 205 may receive a dataset replacement indication 290 (e.g., via a network connection for a wired communication network, a wireless communication network, or the like) that indicates an upcoming synchronized data replacement in which each processing client of a plurality of processing clients are to synchronously replace a first synchronized dataset with a second synchronized dataset, the dataset replacement indication 290 further indicating a request period 260 during which the plurality of processing clients are to request, at randomized times within the request period, the second synchronized dataset. For example, the request period 260 may be a period of time measured relative to the expiration time 265 during which the first processing client 205 and the second processing clients 206 may transmit a corresponding query 280 and receive a corresponding response 285.

In some examples, the dataset replacement indication 290 may indicate one or more methods, operations, procedures, or information by which the various processing clients are to determine one or more randomized times at which the various processing clients are to transmit respective queries 280. For example, the processing clients may use one or more items of information as "seed" values for generating a random or pseudorandom time value that falls within the request period 260 for transmitting one or more queries 280.

Such a seed value may be directly indicated in the dataset replacement indication 290 or the dataset replacement indication 290 may indicate to use a value obtained elsewhere as a "seed" value. Such information for use as a "seed" values may include an identifier of a processing client, a duration of the request period 260, an amount of time remaining in the request period 260, a startup time or other characteristic or value of an application associated with the processing client, a quantity of transactions or operations performed by a processing entity, a value indicated in the dataset replacement indication 290 (e.g., where different random values may be indicated to different processing clients), a time at which the dataset replacement indication 290 is received at a processing client, one or more other values, or any combination thereof.

Additionally, or alternatively, in some examples, the data source 210 may directly indicate a time during the request period 260 at which a processing client is to transmit a query 280. In this manner, the data source 210 may schedule queries 280 across the request period 260. In some such examples, the data source 210 may perform the random calculations (e.g., based on a "seed" value as described herein) and may schedule transmission of the queries 280 for the processing clients based on the random generation process.

In some examples, in response to transmitting the dataset replacement indication 290, the data source 210 may make the second dataset 275 available at the data source 210 (e.g., so that the second dataset 275 is available at or before the start of the request period 260). In some examples, the data source 210 may expose the second dataset 275 to the processing clients, making it available for transmission (e.g., by the data source 210 or associated processing entity) or retrieval (e.g., by one or more processing entities).

In some examples, the first synchronized dataset describes a product category tree associated with an online marketplace and the second synchronized dataset describes a modified version of the product category tree. In some examples, the first synchronized dataset describes online marketplace metadata associated with an online marketplace and the second synchronized dataset describes a modified version of the online marketplace metadata.

At 235, the first processing client 205 may transmit, based on the dataset replacement indication and at a first randomized time within the request period (e.g., as determined using one or more techniques as described herein), a query 280 requesting the second synchronized dataset that is to replace the first synchronized dataset. For example, the first processing client 205 may transmit the query 280 at the randomized time that was determined by the first processing client 205 as described herein (e.g., using a "seed" value to determine the randomized time). In some examples, the first processing client 205 may transmit the query 280 in response to a trigger. The trigger may be based on arrival at the determined randomized time, arrival at a time indicated by the data source 210 or associated processing entity, a point in time relative to the request period 260 (e.g., the beginning, an amount of progress through the request period such as a halfway point or a one-quarter point, a predetermined or indicated "last chance" point in time during the request period 260 after which, the end, or any combination thereof), the expiration time 265, a point in time relative to the expiration time 265, an explicit indication to initiate a query 280, one or more other triggers, or any combination thereof.

In some examples, the first processing client 205 may transmit a query 280 but may not receive a response 285 or may receive an indication that no second dataset 275 is available at the data source 210 or an indication that the first processing client 205 is to retransmit the query 280 after a backoff period or waiting period. Such a scenario may occur if the query 280 is transmitted outside of the request period 260 (e.g., as part of a periodic, aperiodic, or on-demand updating process for the first dataset 270) or for other reasons (e.g., communication failure). For example, in some cases, the first processing client 205 may transmit occasional queries 280 to the data source 210 even without having received a dataset replacement indication 290 (e.g., as a stopgap or failsafe measure). The first processing client 205 may retransmit the query 280 to the data source 210 after a backoff period or waiting time after the initial transmission of the query 280. In some examples, the backoff period or waiting time may be based on one or more factors, including an amount of time remaining in the request period 260, a quantity of queries 280 transmitted during the request period 260, a quantity of indications received that indicate that no second dataset 275 is available, a "seed" value (including those examples of "seed" values described elsewhere herein), one or more other factors, or any combination thereof.

In some examples, the first processing client 205 may periodically transmit one or more additional queries 280 requesting one or more additional synchronized datasets. In some examples, the first processing client 205 may monitor for one or more responses 285 to the one or more additional queries.

In some examples, the second processing client 206-*a* and the second processing client 206-*b* may transmit respective queries 280 and receive respective responses 285 so that the second processing client 206-*a* and the second processing client 206-*b* may receive the second dataset 275 as well. Though some examples of operations and processing are described in relation to the first processing client 205, such operations and processing are equally applicable At 240, the first processing client 205 may receive, based on transmitting the query, a response 285 that may include the second synchronized dataset and an indication of an expiration time for the first synchronized dataset, the expiration time indicating when the plurality of processing clients are to replace the first synchronized dataset with the second synchronized dataset.

In some examples, the data source 210 or an associated processing entity may adjust a trigger time or other trigger information, the expiration time 265, or both, based on metadata or other information associated with the request period 260. For example, after the data source 210 transmits the response 285 to the first processing client 205, the data source 210 may measure an amount of time, an amount of processing resources expended, other information, or any combination thereof and may adjust trigger time or other trigger information, the expiration time 265, or both. For example, if a processing time associated with the first processing client 205 exceeds a threshold (e.g., where the threshold may be based on an amount of time allocated for providing the second dataset 275 to the first processing client 205) data source 210 may adjust the expiration time 265 to be later to allow for more time for all of the processing clients to obtain the second dataset 275 before the expiration time 265. In such a case, the data source 210 may transmit an updated expiration time 265 to the processing clients. Further, in some examples, the data source 210 may adjust a trigger time or other trigger information, the expiration time 265, or both, based on a threshold quantity of processing elements for which respective processing times each exceed a threshold processing time value. For example, if 30 percent (or another threshold amount) of processing clients exceed a processing time threshold (be they the same threshold or different thresholds for different processing clients), the data source 210 may adjust the expiration time 265 to be later to allow for more time for all of the processing clients to obtain the second dataset 275 before the expiration time 265.

At 245, the first processing client 205 may store, at a first processing client prior to the expiration time for the first synchronized dataset and based on receiving the response, the second synchronized dataset and the indication of the expiration time for the first synchronized dataset. Similarly, the second processing clients 206 may store the second dataset and the indication of the expiration time 265 after receiving respective responses 285 from the data source 210 that include the second dataset 275 and the indication of the expiration time 265.

At 250, the first processing client 205 may replace, at the first processing client and in response to the expiration time 265 for the first synchronized dataset occurring, the first synchronized dataset with the second synchronized dataset. In some examples, replacing the first synchronized dataset with the second synchronized dataset may include adjusting at least one pointer in memory implemented by a storage device from the first synchronized dataset to the second synchronized dataset. In some examples, the first processing client 205 and the second processing clients (and any other processing clients that are to replace the first dataset 270 with the second dataset 275) may replace the first dataset 270 with the second dataset 275 in a synchronized manner. As such, the state of the various clients may be synchronized while avoiding the pitfalls present in other approaches.

In some examples, the process flow 200 that may provide an automatic refresh-ahead mechanism which is adopted by the clients 205 and 206. The data source 210 may be periodically checked for new data, and the new data with its effective time may be distributed prior to an expiration of the current data. Once the effective time occurs, the expired data may be deleted (e.g., flushed) and the clients 205 and 206 may point to the new data by an atomic swap operation. The techniques described herein may solve the inconsistency problem of conventional techniques since refresh delays may be reduced (e.g., to almost zero), as up to all the clients may store the new data before the current data is considered to be expired. Once the current data expires, the clients 205 and 206 atomically point to the new data which is already stored at the clients 205 and 206, such that the refresh is done automatically as the event occurred (e.g., timer expiration), and up to all the clients are synchronized across an organization.

Figure 3:
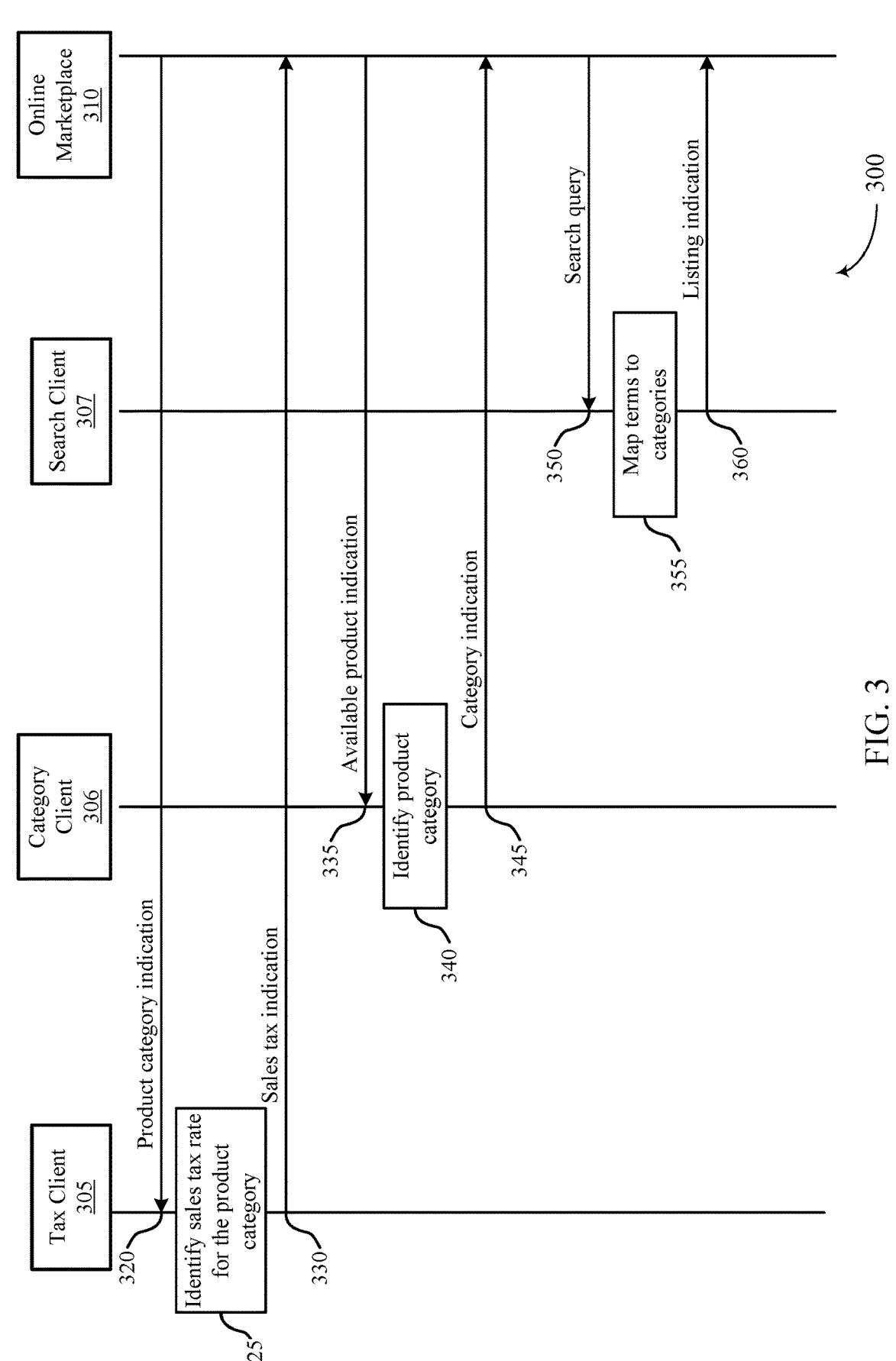
FIG. 3 shows an example of a process flow that supports synchronizing state in large-scale distribution systems in accordance with examples as disclosed herein.

FIG. 3 shows an example of a process flow 300 that supports synchronizing state in large-scale distribution systems in accordance with examples as disclosed herein. The process flow 300 may implement various aspects of the present disclosure described herein. The elements described in the process flow 300 (e.g., tax client 305 and online marketplace 310) may be examples of similarly named elements described herein.

In the following description of the process flow 300, the operations between the various entities or elements may be performed in different orders or at different times. Some operations may also be left out of the process flow 300, or other operations may be added. Although the various entities or elements (e.g., the tax client 305, the category client 306, the search client 307, and the online marketplace 310) are shown performing the operations of the process flow 300, some aspects of some operations may also be performed by other entities or elements of the process flow 300 or by entities or elements that are not depicted in the process flow, or any combination thereof. Further, though some clients are shown, the operations described herein may be applied to any quantity of clients.

At 320, the tax client 305 may receive an indication of a first product category within a product category tree of the online marketplace 310 and the first synchronized dataset and the second synchronized dataset each describe a product category tree of an online marketplace 310 and a plurality of sales tax rates for respective product categories of the product category tree. The product category tree may provide a system of classification in which each product of the online marketplace 310 is included in at least one category of a plurality of categories of the product category tree.

At 325, the tax client 305 may identify a first sales tax rate for the first product category indicated by the first synchronized dataset prior to the expiration time for the first synchronized dataset or a second sales tax rate for the first product category indicated by the second synchronized dataset after the expiration time.

At 330, the tax client 305 may transmit, to the online marketplace 310, an indication of one of the first sales tax rate or the second sales tax rate, or an indication of a calculated amount of sales tax for a purchase price of an item calculated using one of the first sales tax rate or the second sales tax rate. The online marketplace 310 may then use the calculated amount of sales tax for completing a purchase transaction between a buyer and a seller.

At 335, the category client 306 may receive an indication of a product available from the online marketplace 310 and the first synchronized dataset describes a product category tree having a first category structure for an online marketplace 310 and the second synchronized dataset describes the product category tree having a second category structure that differs from the first category structure.

At 340, the category client 306 may identify, identifying in which product category of a plurality of product categories of the product category tree the product is classified using one of the first synchronized dataset prior to the expiration time for the first synchronized dataset or the second synchronized dataset after the expiration time.

At 345, the category client 306 may transmit, to the online marketplace 310, an indication of the identified product category or data associated with the identified product category. In some examples, the data may indicate a sales tax rate for products categorized within the identified product category, a geo-location to which the online marketplace 310 ships products categorized within the identified product category, a delivery estimate for products categorized within the identified product category, a shipping cost estimate for products categorized within the identified product category, or any combination thereof. The online marketplace 310 may then use the identified product category or data associated with the identified product category for completing a purchase transaction between a buyer and a seller.

At 350, the search client 307 may receive a search query via an online marketplace 310 and the first synchronized dataset describes a product category tree having a first category structure for an online marketplace 310 and the second synchronized dataset describes the product category tree having a second category structure that differs from the first category structure.

At 355, the search client 307 may map one or more terms, such as one or more words or text, in the search query to one or more product categories of the product category tree using one of the first synchronized dataset prior to the expiration time of the first synchronized dataset or the second synchronized dataset after the expiration time.

At 360, the search client 307 may return an indication of one or more listings from the one or more product categories based on the one or more terms in the search query. The online marketplace 310 may then return search results that includes one or more listings from the one or more product categories to a prospective buyer, and may further facilitate a purchase transaction for an item corresponding to at least one of the one or more listings.

In some examples, the tax client 305, the category client 306, the search client 307, or any combination thereof, may update or transmit an indication of an update associated with the first dataset, the second dataset, or both, and such an update may be based on one or more metrics or metadata associated with the operations of the client. For example, the category client 306 may analyze products that are identified to be in a product category and may determine one or more success metrics (e.g., sale status, sale price, re-listing of the product, or other success metric) and may determine an update to the first dataset or second dataset based on the one or more success metrics. For example, if an item is poorly categorized in the first dataset, the category client 306 may determine this by analyzing sales information associated with the product and the associated product category. Similarly, the search client 307 may analyze products that are determined appear in search results, determine one or more associated success metrics, and determine an update to the first dataset or second dataset based on the one or more success metrics. For example, if an item is associated with one or more search terms, but the appearance of the product in search results associated with search queries that are themselves associated with the one or more search terms does not result in sales, it may indicate that the item's association with the search terms is not correct, and such information should be updated in the first dataset or the second dataset.

Figure 4:
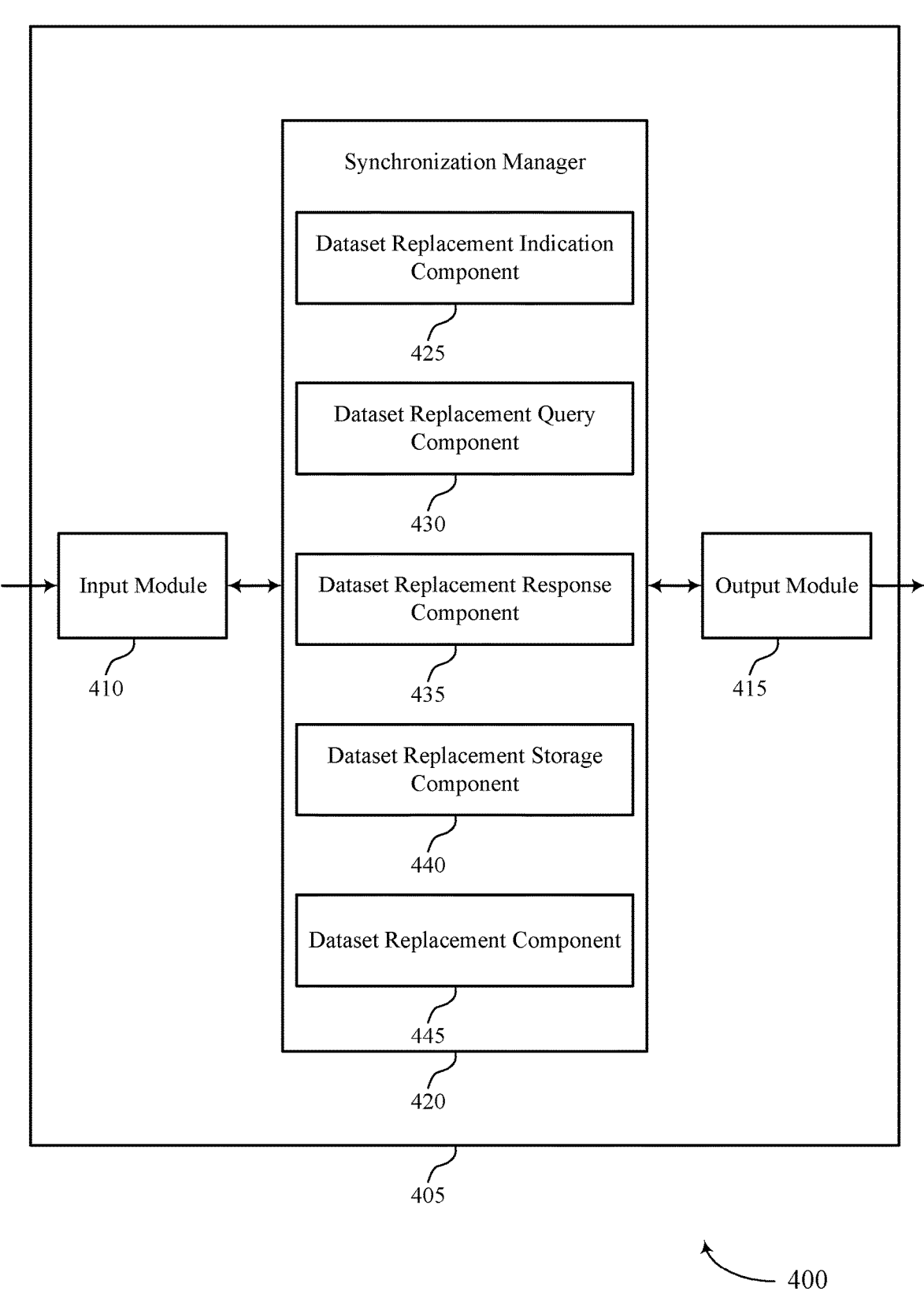
FIG. 4 shows a block diagram of an apparatus that supports synchronizing state in large-scale distribution systems in accordance with examples as disclosed herein.

FIG. 4 shows a block diagram 400 of a device 405 that supports synchronizing state in large-scale distribution systems in accordance with examples as disclosed herein. The device 405 may include an input module 410, an output module 415, and a synchronization manager 420. The device 405, or one or more components of the device 405 (e.g., the input module 410, the output module 415, and the synchronization manager 420), may include at least one processor, which may be coupled with at least one memory, to support the described techniques of the processing clients 205 and 206. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the synchronization manager 420 to support synchronizing state in large-scale distribution systems. In some cases, the input module 410 may be a component of an I/O controller 610 as described with reference to FIG. 6.

The output module 415 may manage output signals for the device 405. For example, the output module 415 may receive signals from other components of the device 405, such as the synchronization manager 420, and may transmit these signals to other components or devices. In some examples, the output module 415 may transmit output signals for display in a user interface, for storage in a database or data store, for further processing at a server or server cluster, or for any other processes at any quantity of devices or systems. In some cases, the output module 415 may be a component of an I/O controller 610 as described with reference to FIG. 6.

For example, the synchronization manager 420 may include a dataset replacement indication component 425, a dataset replacement query component 430, a dataset replacement response component 435, a dataset replacement storage component 440, a dataset replacement component 445, or any combination thereof. In some examples, the synchronization manager 420, or various components thereof, may be configured to perform various operations (e.g., receiving, monitoring, transmitting) using or otherwise in cooperation with the input module 410, the output module 415, or both. For example, the synchronization manager 420 may receive information from the input module 410, send information to the output module 415, or be integrated in combination with the input module 410, the output module 415, or both to receive information, transmit information, or perform various other operations as described herein.

The synchronization manager 420 may support synchronized data replacement in accordance with examples as disclosed herein. The dataset replacement indication component 425 may be configured to support receiving a dataset replacement indication that indicates an upcoming synchronized data replacement in which each processing client of a set of multiple processing clients are to synchronously replace a first synchronized dataset with a second synchronized dataset, the dataset replacement indication further indicating a request period during which the set of multiple processing clients are to request, at randomized times within the request period, the second synchronized dataset. The dataset replacement query component 430 may be configured to support transmitting, based on the dataset replacement indication and at a first randomized time within the request period, a query requesting the second synchronized dataset that is to replace the first synchronized dataset. The dataset replacement response component 435 may be configured to support receiving, based on transmitting the query, a response including the second synchronized dataset and an indication of an expiration time for the first synchronized dataset, the expiration time indicating when the set of multiple processing clients are to replace the first synchronized dataset with the second synchronized dataset. The dataset replacement storage component 440 may be configured to support storing, at a first processing client prior to the expiration time for the first synchronized dataset and based on receiving the response, the second synchronized dataset and the indication of the expiration time for the first synchronized dataset. The dataset replacement component 445 may be configured to support replacing, at the first processing client and in response to the expiration time for the first synchronized dataset occurring, the first synchronized dataset with the second synchronized dataset.

Figure 5:
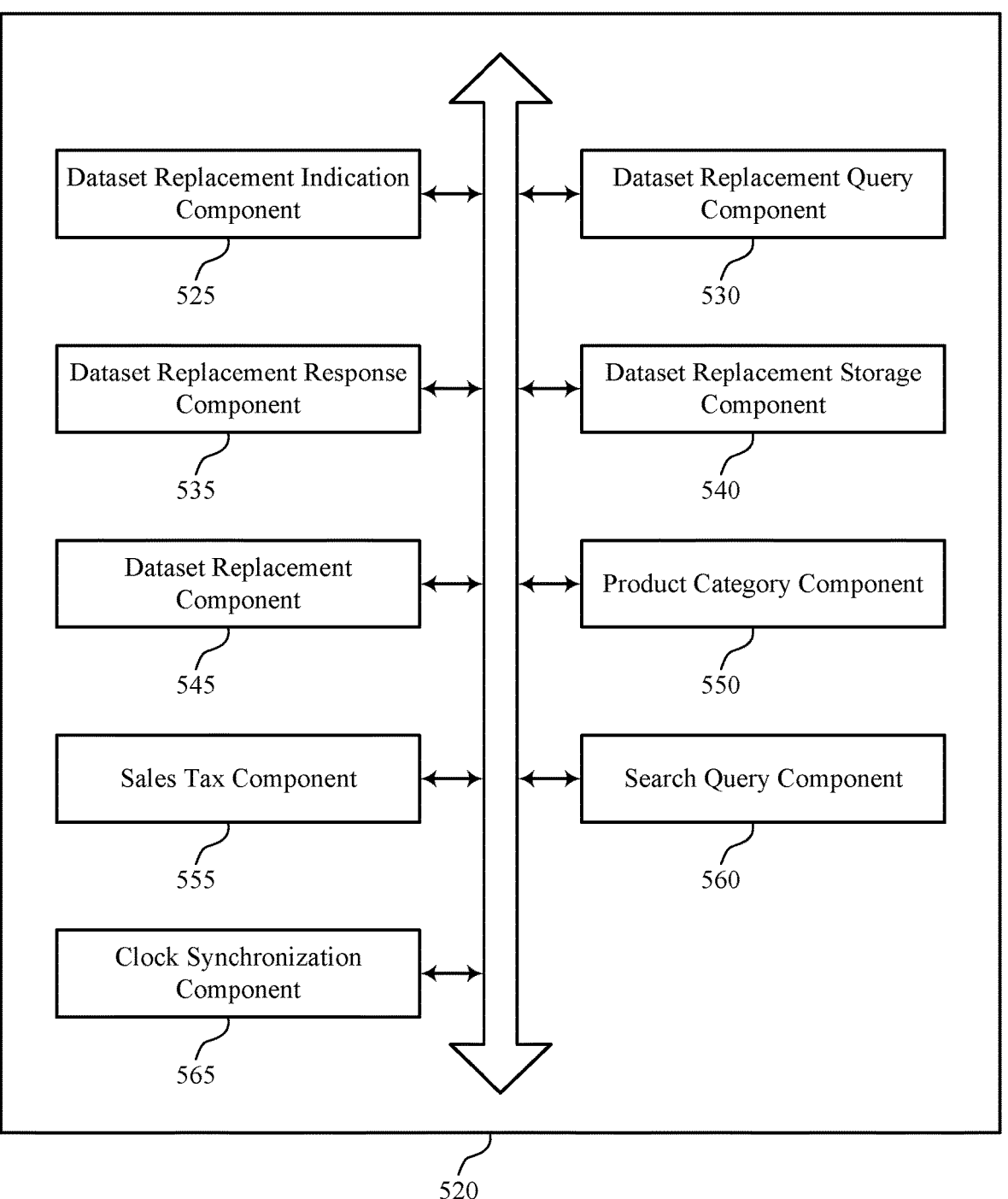
FIG. 5 shows a block diagram of a synchronization manager that supports synchronizing state in large-scale distribution systems in accordance with examples as disclosed herein.

FIG. 5 shows a block diagram 500 of a synchronization manager 520 that supports synchronizing state in large-scale distribution systems in accordance with examples as disclosed herein. The synchronization manager 520 may be an example of aspects of a synchronization manager or a synchronization manager 420, or both, as described herein. The synchronization manager 520, or various components thereof, may be an example of means for performing various aspects of synchronizing state in large-scale distribution systems as described herein. For example, the synchronization manager 520 may include a dataset replacement indication component 525, a dataset replacement query component 530, a dataset replacement response component 535, a dataset replacement storage component 540, a dataset replacement component 545, a product category component 550, a sales tax component 555, a search query component 560, a clock synchronization component 565, or any combination thereof. Each of these components, or components of subcomponents thereof (e.g., one or more processors, one or more memories), may communicate, directly or indirectly, with one another (e.g., via one or more buses).

The synchronization manager 520 may support synchronized data replacement in accordance with examples as disclosed herein. The dataset replacement indication component 525 may be configured to support receiving a dataset replacement indication that indicates an upcoming synchronized data replacement in which each processing client of a set of multiple processing clients are to synchronously replace a first synchronized dataset with a second synchronized dataset, the dataset replacement indication further indicating a request period during which the set of multiple processing clients are to request, at randomized times within the request period, the second synchronized dataset. The dataset replacement query component 530 may be configured to support transmitting, based on the dataset replacement indication and at a first randomized time within the request period, a query requesting the second synchronized dataset that is to replace the first synchronized dataset. The dataset replacement response component 535 may be configured to support receiving, based on transmitting the query, a response including the second synchronized dataset and an indication of an expiration time for the first synchronized dataset, the expiration time indicating when the set of multiple processing clients are to replace the first synchronized dataset with the second synchronized dataset. The dataset replacement storage component 540 may be configured to support storing, at a first processing client prior to the expiration time for the first synchronized dataset and based on receiving the response, the second synchronized dataset and the indication of the expiration time for the first synchronized dataset. The dataset replacement component 545 may be configured to support replacing, at the first processing client and in response to the expiration time for the first synchronized dataset occurring, the first synchronized dataset with the second synchronized dataset.

In some examples, the first synchronized dataset and the second synchronized dataset each describe a product category tree of an online marketplace and a set of multiple sales tax rates for respective product categories of the product category tree, and the product category component 550 may be configured to support receiving an indication of a first product category within the product category tree of the online marketplace. In some examples, the first synchronized dataset and the second synchronized dataset each describe a product category tree of an online marketplace and a set of multiple sales tax rates for respective product categories of the product category tree, and the sales tax component 555 may be configured to support identifying a first sales tax rate for the first product category indicated by the first synchronized dataset prior to the expiration time for the first synchronized dataset or a second sales tax rate for the first product category indicated by the second synchronized dataset after the expiration time. In some examples, the first synchronized dataset and the second synchronized dataset each describe a product category tree of an online marketplace and a set of multiple sales tax rates for respective product categories of the product category tree, and the sales tax component 555 may be configured to support transmitting, to the online marketplace, an indication of one of the first sales tax rate or the second sales tax rate, or an indication of a calculated amount of sales tax for a purchase price of an item calculated using one of the first sales tax rate or the second sales tax rate.

In some examples, the first synchronized dataset describes a product category tree having a first category structure for an online marketplace and the second synchronized dataset describes the product category tree having a second category structure that differs from the first category structure, and the product category component 550 may be configured to support receiving an indication of a product available from the online marketplace. In some examples, the first synchronized dataset describes a product category tree having a first category structure for an online marketplace and the second synchronized dataset describes the product category tree having a second category structure that differs from the first category structure, and the product category component 550 may be configured to support identifying in which product category of a set of multiple product categories of the product category tree the product is classified using one of the first synchronized dataset prior to the expiration time for the first synchronized dataset or the second synchronized dataset after the expiration time. In some examples, the first synchronized dataset describes a product category tree having a first category structure for an online marketplace and the second synchronized dataset describes the product category tree having a second category structure that differs from the first category structure, and the product category component 550 may be configured to support transmitting, to the online marketplace, an indication of the identified product category or data associated with the identified product category.

In some examples, the data indicates a sales tax rate for products categorized within the identified product category, a geo-location to which the online marketplace ships products categorized within the identified product category, a delivery estimate for products categorized within the identified product category, a shipping cost estimate for products categorized within the identified product category, or any combination thereof.

In some examples, the first synchronized dataset describes a product category tree having a first category structure for an online marketplace and the second synchronized dataset describes the product category tree having a second category structure that differs from the first category structure, and the search query component 560 may be configured to support receiving a search query via an online marketplace. In some examples, the first synchronized dataset describes a product category tree having a first category structure for an online marketplace and the second synchronized dataset describes the product category tree having a second category structure that differs from the first category structure, and the product category component 550 may be configured to support mapping one or more terms in the search query to one or more product categories of the product category tree using one of the first synchronized dataset prior to the expiration time of the first synchronized dataset or the second synchronized dataset after the expiration time. In some examples, the first synchronized dataset describes a product category tree having a first category structure for an online marketplace and the second synchronized dataset describes the product category tree having a second category structure that differs from the first category structure, and the search query component 560 may be configured to support returning an indication of one or more listings from the one or more product categories based on the one or more terms in the search query.

In some examples, the dataset replacement query component 530 may be configured to support periodically transmitting one or more additional queries requesting one or more additional synchronized datasets. In some examples, the dataset replacement response component 535 may be configured to support monitoring for one or more responses to the one or more additional queries.

In some examples, the first synchronized dataset describes a product category tree associated with an online marketplace and the second synchronized dataset describes a modified version of the product category tree.

In some examples, the first synchronized dataset describes online marketplace metadata associated with an online marketplace and the second synchronized dataset describes a modified version of the online marketplace metadata.

In some examples, the clock synchronization component 565 may be configured to support synchronizing a clock of the first processing client with one or more additional clocks associated with one or more second processing clients of the set of multiple processing clients.

In some examples, to support replacing the first synchronized dataset with the second synchronized dataset, the dataset replacement component 545 may be configured to support adjusting at least one pointer in memory implemented by a storage device from the first synchronized dataset to the second synchronized dataset.

Figure 6:
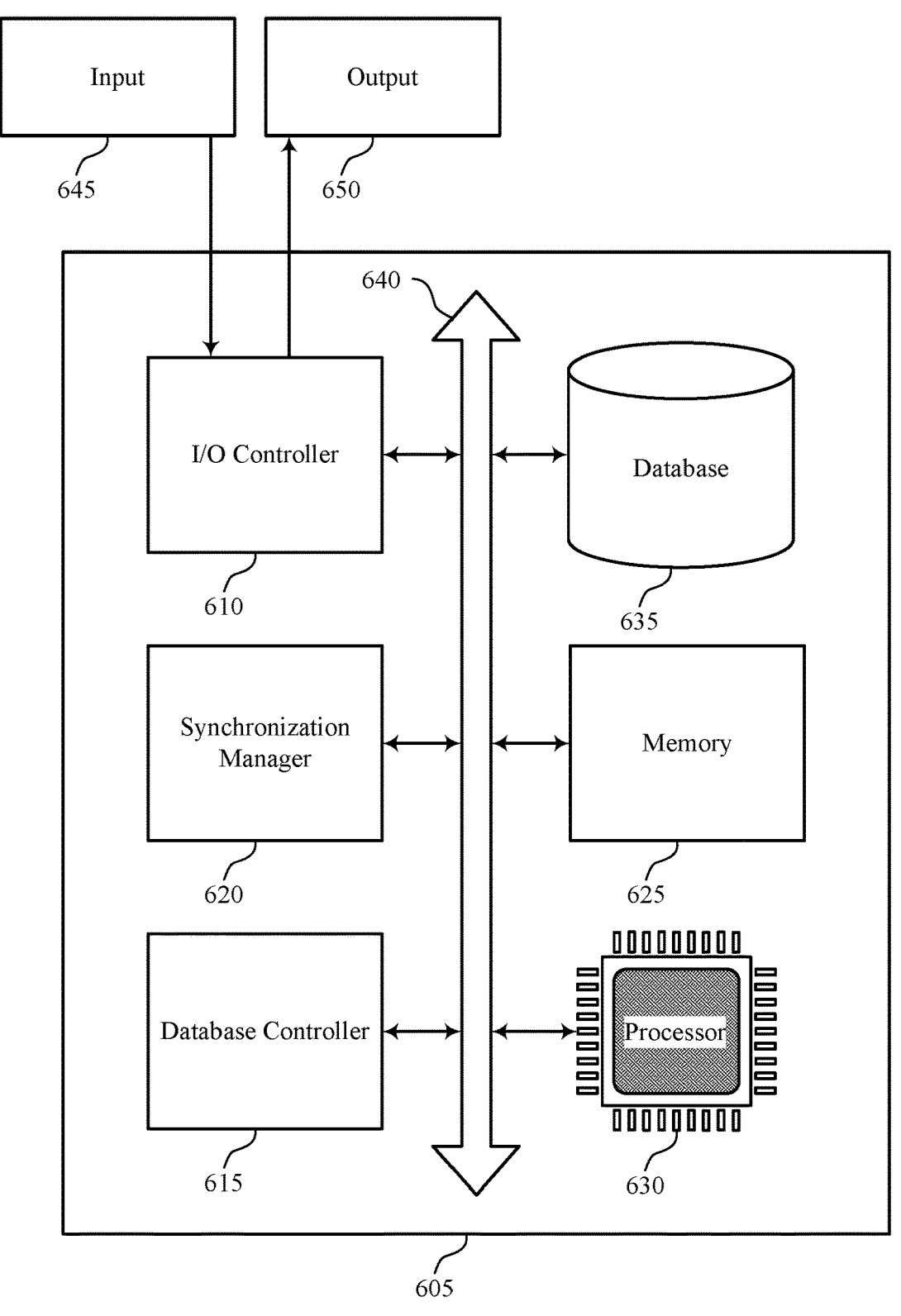
FIG. 6 shows a diagram of a system including a device that supports synchronizing state in large-scale distribution systems in accordance with examples as disclosed herein.

FIG. 6 shows a diagram of a system 600 including a device 605 that supports synchronizing state in large-scale distribution systems in accordance with examples as disclosed herein. The device 605 may be an example of or include the components of a device 405 as described herein, and may be used to implement the clients 205 and 206, the data source 210, the administrator 215, or the like. The device 605 may include components for bi-directional data communications including components for transmitting and receiving communications, such as a synchronization manager 620, an I/O controller 610, a database controller 615, at least one memory 625, at least one processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor 630. In some examples, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and ROM. The memory 625 may store computer-readable, computer-executable software including instructions that, when executed, cause the processor 630 to perform various functions described herein. In some cases, the memory 625 may contain, among other things, a BIOS which may control basic hardware or software operation such as the interaction with peripheral components or devices.

The processor 630 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in a memory 625 to perform various functions (e.g., functions or tasks supporting synchronizing state in large-scale distribution systems).

The synchronization manager 620 may support synchronized data replacement in accordance with examples as disclosed herein. For example, the synchronization manager 620 may be configured to support receiving a dataset replacement indication that indicates an upcoming synchronized data replacement in which each processing client of a set of multiple processing clients are to synchronously replace a first synchronized dataset with a second synchronized dataset, the dataset replacement indication further indicating a request period during which the set of multiple processing clients are to request, at randomized times within the request period, the second synchronized dataset. The synchronization manager 620 may be configured to support transmitting, based on the dataset replacement indication and at a first randomized time within the request period, a query requesting the second synchronized dataset that is to replace the first synchronized dataset. The synchronization manager 620 may be configured to support receiving, based on transmitting the query, a response including the second synchronized dataset and an indication of an expiration time for the first synchronized dataset, the expiration time indicating when the set of multiple processing clients are to replace the first synchronized dataset with the second synchronized dataset. The synchronization manager 620 may be configured to support storing, at a first processing client prior to the expiration time for the first synchronized dataset and based on receiving the response, the second synchronized dataset and the indication of the expiration time for the first synchronized dataset. The synchronization manager 620 may be configured to support replacing, at the first processing client and in response to the expiration time for the first synchronized dataset occurring, the first synchronized dataset with the second synchronized dataset.

By including or configuring the synchronization manager 620 in accordance with examples as described herein, the device 605 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

FIG. 7 shows a flowchart illustrating a method 700 that supports synchronizing state in large-scale distribution systems in accordance with examples as disclosed herein. The operations of the method 700 may be implemented by a data processing device or its components as described herein. For example, the operations of the method 700 may be performed by a data processing device as described with reference to FIGS. 1 through 6. In some examples, a data processing device may execute a set of instructions to control the functional elements of the data processing device to perform the described functions. Additionally, or alternatively, the data processing device may perform aspects of the described functions using special-purpose hardware.

At 705, the method may include receiving a dataset replacement indication that indicates an upcoming synchronized data replacement in which each processing client of a set of multiple processing clients are to synchronously replace a first synchronized dataset with a second synchronized dataset, the dataset replacement indication further indicating a request period during which the set of multiple processing clients are to request, at randomized times within the request period, the second synchronized dataset. The operations of block 705 may be performed in accordance with examples as disclosed herein. In some examples, aspects of the operations of 705 may be performed by a dataset replacement indication component 525 as described with reference to FIG. 5.

At 710, the method may include transmitting, based on the dataset replacement indication and at a first randomized time within the request period, a query requesting the second synchronized dataset that is to replace the first synchronized dataset. The operations of block 710 may be performed in accordance with examples as disclosed herein. In some examples, aspects of the operations of 710 may be performed by a dataset replacement query component 530 as described with reference to FIG. 5.

At 715, the method may include receiving, based on transmitting the query, a response including the second synchronized dataset and an indication of an expiration time for the first synchronized dataset, the expiration time indicating when the set of multiple processing clients are to replace the first synchronized dataset with the second synchronized dataset. The operations of block 715 may be performed in accordance with examples as disclosed herein. In some examples, aspects of the operations of 715 may be performed by a dataset replacement response component 535 as described with reference to FIG. 5.

At 720, the method may include storing, at a first processing client prior to the expiration time for the first synchronized dataset and based on receiving the response, the second synchronized dataset and the indication of the expiration time for the first synchronized dataset. The operations of block 720 may be performed in accordance with examples as disclosed herein. In some examples, aspects of the operations of 720 may be performed by a dataset replacement storage component 540 as described with reference to FIG. 5.

At 725, the method may include replacing, at the first processing client and in response to the expiration time for the first synchronized dataset occurring, the first synchronized dataset with the second synchronized dataset. The operations of block 725 may be performed in accordance with examples as disclosed herein. In some examples, aspects of the operations of 725 may be performed by a dataset replacement component 545 as described with reference to FIG. 5.

FIG. 8 shows a flowchart illustrating a method 800 that supports synchronizing state in large-scale distribution systems in accordance with examples as disclosed herein. The operations of the method 800 may be implemented by a data processing device or its components as described herein. For example, the operations of the method 800 may be performed by a data processing device as described with reference to FIGS. 1 through 6. In some examples, a data processing device may execute a set of instructions to control the functional elements of the data processing device to perform the described functions. Additionally, or alternatively, the data processing device may perform aspects of the described functions using special-purpose hardware.

At 805, the method may include receiving a dataset replacement indication that indicates an upcoming synchronized data replacement in which each processing client of a set of multiple processing clients are to synchronously replace a first synchronized dataset with a second synchronized dataset, the dataset replacement indication further indicating a request period during which the set of multiple processing clients are to request, at randomized times within the request period, the second synchronized dataset. The operations of block 805 may be performed in accordance with examples as disclosed herein. In some examples, aspects of the operations of 805 may be performed by a dataset replacement indication component 525 as described with reference to FIG. 5.

At 810, the method may include transmitting, based on the dataset replacement indication and at a first randomized time within the request period, a query requesting the second synchronized dataset that is to replace the first synchronized dataset. The operations of block 810 may be performed in accordance with examples as disclosed herein. In some examples, aspects of the operations of 810 may be performed by a dataset replacement query component 530 as described with reference to FIG. 5.

At 815, the method may include receiving, based on transmitting the query, a response including the second synchronized dataset and an indication of an expiration time for the first synchronized dataset, the expiration time indicating when the set of multiple processing clients are to replace the first synchronized dataset with the second synchronized dataset. The operations of block 815 may be performed in accordance with examples as disclosed herein. In some examples, aspects of the operations of 815 may be performed by a dataset replacement response component 535 as described with reference to FIG. 5.

At 820, the method may include storing, at a first processing client prior to the expiration time for the first synchronized dataset and based on receiving the response, the second synchronized dataset and the indication of the expiration time for the first synchronized dataset. The operations of block 820 may be performed in accordance with examples as disclosed herein. In some examples, aspects of the operations of 820 may be performed by a dataset replacement storage component 540 as described with reference to FIG. 5.

At 825, the method may include replacing, at the first processing client and in response to the expiration time for the first synchronized dataset occurring, the first synchronized dataset with the second synchronized dataset. The operations of block 825 may be performed in accordance with examples as disclosed herein. In some examples, aspects of the operations of 825 may be performed by a dataset replacement component 545 as described with reference to FIG. 5.

At 830, the method may include receiving an indication of a first product category within the product category tree of the online marketplace. The operations of block 830 may be performed in accordance with examples as disclosed herein. In some examples, aspects of the operations of 830 may be performed by a product category component 550 as described with reference to FIG. 5.

At 835, the method may include identifying a first sales tax rate for the first product category indicated by the first synchronized dataset prior to the expiration time for the first synchronized dataset or a second sales tax rate for the first product category indicated by the second synchronized dataset after the expiration time. The operations of block 835 may be performed in accordance with examples as disclosed herein. In some examples, aspects of the operations of 835 may be performed by a sales tax component 555 as described with reference to FIG. 5.

At 840, the method may include transmitting, to the online marketplace, an indication of one of the first sales tax rate or the second sales tax rate, or an indication of a calculated amount of sales tax for a purchase price of an item calculated using one of the first sales tax rate or the second sales tax rate. The operations of block 840 may be performed in accordance with examples as disclosed herein. In some examples, aspects of the operations of 840 may be performed by a sales tax component 555 as described with reference to FIG. 5.

FIG. 9 shows a flowchart illustrating a method 900 that supports synchronizing state in large-scale distribution systems in accordance with examples as disclosed herein. The operations of the method 900 may be implemented by a data processing device or its components as described herein. For example, the operations of the method 900 may be performed by a data processing device as described with reference to FIGS. 1 through 6. In some examples, a data processing device may execute a set of instructions to control the functional elements of the data processing device to perform the described functions. Additionally, or alternatively, the data processing device may perform aspects of the described functions using special-purpose hardware.

At 905, the method may include receiving a dataset replacement indication that indicates an upcoming synchronized data replacement in which each processing client of a set of multiple processing clients are to synchronously replace a first synchronized dataset with a second synchronized dataset, the dataset replacement indication further indicating a request period during which the set of multiple processing clients are to request, at randomized times within the request period, the second synchronized dataset. The operations of block 905 may be performed in accordance with examples as disclosed herein. In some examples, aspects of the operations of 905 may be performed by a dataset replacement indication component 525 as described with reference to FIG. 5.

At 910, the method may include transmitting, based on the dataset replacement indication and at a first randomized time within the request period, a query requesting the second synchronized dataset that is to replace the first synchronized dataset. The operations of block 910 may be performed in accordance with examples as disclosed herein. In some examples, aspects of the operations of 910 may be performed by a dataset replacement query component 530 as described with reference to FIG. 5.

At 915, the method may include receiving, based on transmitting the query, a response including the second synchronized dataset and an indication of an expiration time for the first synchronized dataset, the expiration time indicating when the set of multiple processing clients are to replace the first synchronized dataset with the second synchronized dataset. The operations of block 915 may be performed in accordance with examples as disclosed herein. In some examples, aspects of the operations of 915 may be performed by a dataset replacement response component 535 as described with reference to FIG. 5.

At 920, the method may include storing, at a first processing client prior to the expiration time for the first synchronized dataset and based on receiving the response, the second synchronized dataset and the indication of the expiration time for the first synchronized dataset. The operations of block 920 may be performed in accordance with examples as disclosed herein. In some examples, aspects of the operations of 920 may be performed by a dataset replacement storage component 540 as described with reference to FIG. 5.

At 925, the method may include replacing, at the first processing client and in response to the expiration time for the first synchronized dataset occurring, the first synchronized dataset with the second synchronized dataset. The operations of block 925 may be performed in accordance with examples as disclosed herein. In some examples, aspects of the operations of 925 may be performed by a dataset replacement component 545 as described with reference to FIG. 5.

At 930, the method may include receiving an indication of a product available from the online marketplace. The operations of block 930 may be performed in accordance with examples as disclosed herein. In some examples, aspects of the operations of 930 may be performed by a product category component 550 as described with reference to FIG. 5.

At 935, the method may include identifying in which product category of a set of multiple product categories of the product category tree the product is classified using one of the first synchronized dataset prior to the expiration time for the first synchronized dataset or the second synchronized dataset after the expiration time. The operations of block 935 may be performed in accordance with examples as disclosed herein. In some examples, aspects of the operations of 935 may be performed by a product category component 550 as described with reference to FIG. 5.

At 940, the method may include transmitting, to the online marketplace, an indication of the identified product category or data associated with the identified product category. The operations of block 940 may be performed in accordance with examples as disclosed herein. In some examples, aspects of the operations of 940 may be performed by a product category component 550 as described with reference to FIG. 5.

FIG. 10 shows a flowchart illustrating a method 1000 that supports synchronizing state in large-scale distribution systems in accordance with examples as disclosed herein. The operations of the method 1000 may be implemented by a data processing device or its components as described herein. For example, the operations of the method 1000 may be performed by a data processing device as described with reference to FIGS. 1 through 6. In some examples, a data processing device may execute a set of instructions to control the functional elements of the data processing device to perform the described functions. Additionally, or alternatively, the data processing device may perform aspects of the described functions using special-purpose hardware.

At 1005, the method may include receiving a dataset replacement indication that indicates an upcoming synchronized data replacement in which each processing client of a set of multiple processing clients are to synchronously replace a first synchronized dataset with a second synchronized dataset, the dataset replacement indication further indicating a request period during which the set of multiple processing clients are to request, at randomized times within the request period, the second synchronized dataset. The operations of block 1005 may be performed in accordance with examples as disclosed herein. In some examples, aspects of the operations of 1005 may be performed by a dataset replacement indication component 525 as described with reference to FIG. 5.

At 1010, the method may include transmitting, based on the dataset replacement indication and at a first randomized time within the request period, a query requesting the second synchronized dataset that is to replace the first synchronized dataset. The operations of block 1010 may be performed in accordance with examples as disclosed herein. In some examples, aspects of the operations of 1010 may be performed by a dataset replacement query component 530 as described with reference to FIG. 5.

At 1015, the method may include receiving, based on transmitting the query, a response including the second synchronized dataset and an indication of an expiration time for the first synchronized dataset, the expiration time indicating when the set of multiple processing clients are to replace the first synchronized dataset with the second synchronized dataset. The operations of block 1015 may be performed in accordance with examples as disclosed herein. In some examples, aspects of the operations of 1015 may be performed by a dataset replacement response component 535 as described with reference to FIG. 5.

At 1020, the method may include storing, at a first processing client prior to the expiration time for the first synchronized dataset and based on receiving the response, the second synchronized dataset and the indication of the expiration time for the first synchronized dataset. The operations of block 1020 may be performed in accordance with examples as disclosed herein. In some examples, aspects of the operations of 1020 may be performed by a dataset replacement storage component 540 as described with reference to FIG. 5.

At 1025, the method may include replacing, at the first processing client and in response to the expiration time for the first synchronized dataset occurring, the first synchronized dataset with the second synchronized dataset. The operations of block 1025 may be performed in accordance with examples as disclosed herein. In some examples, aspects of the operations of 1025 may be performed by a dataset replacement component 545 as described with reference to FIG. 5.

At 1030, the method may include receiving a search query via an online marketplace. The operations of block 1030 may be performed in accordance with examples as disclosed herein. In some examples, aspects of the operations of 1030 may be performed by a search query component 560 as described with reference to FIG. 5.

At 1035, the method may include mapping one or more terms in the search query to one or more product categories of the product category tree using one of the first synchronized dataset prior to the expiration time of the first synchronized dataset or the second synchronized dataset after the expiration time. The operations of block 1035 may be performed in accordance with examples as disclosed herein. In some examples, aspects of the operations of 1035 may be performed by a product category component 550 as described with reference to FIG. 5.

At 1040, the method may include returning an indication of one or more listings from the one or more product categories based on the one or more terms in the search query. The operations of block 1040 may be performed in accordance with examples as disclosed herein. In some examples, aspects of the operations of 1040 may be performed by a search query component 560 as described with reference to FIG. 5.

The following provides an overview of aspects of the present disclosure:

Aspect 1: A method for synchronized data replacement, comprising: receiving a dataset replacement indication that indicates an upcoming synchronized data replacement in which each processing client of a plurality of processing clients are to synchronously replace a first synchronized dataset with a second synchronized dataset, the dataset replacement indication further indicating a request period during which the plurality of processing clients are to request, at randomized times within the request period, the second synchronized dataset; transmitting, based at least in part on the dataset replacement indication and at a first randomized time within the request period, a query requesting the second synchronized dataset that is to replace the first synchronized dataset; receiving, based at least in part on transmitting the query, a response comprising the second synchronized dataset and an indication of an expiration time for the first synchronized dataset, the expiration time indicating when the plurality of processing clients are to replace the first synchronized dataset with the second synchronized dataset; storing, at a first processing client prior to the expiration time for the first synchronized dataset and based at least in part on receiving the response, the second synchronized dataset and the indication of the expiration time for the first synchronized dataset; and replacing, at the first processing client and in response to the expiration time for the first synchronized dataset occurring, the first synchronized dataset with the second synchronized dataset.

Aspect 2: The method of aspect 1, wherein the first synchronized dataset and the second synchronized dataset each describe a product category tree of an online marketplace and a plurality of sales tax rates for respective product categories of the product category tree, the method further comprising: receiving an indication of a first product category within the product category tree of the online marketplace; identifying a first sales tax rate for the first product category indicated by the first synchronized dataset prior to the expiration time for the first synchronized dataset or a second sales tax rate for the first product category indicated by the second synchronized dataset after the expiration time; and transmitting, to the online marketplace, an indication of one of the first sales tax rate or the second sales tax rate, or an indication of a calculated amount of sales tax for a purchase price of an item calculated using one of the first sales tax rate or the second sales tax rate.

Aspect 3: The method of any of aspects 1 through 2, wherein the first synchronized dataset describes a product category tree having a first category structure for an online marketplace and the second synchronized dataset describes the product category tree having a second category structure that differs from the first category structure, the method further comprising: receiving an indication of a product available from the online marketplace; identifying in which product category of a plurality of product categories of the product category tree the product is classified using one of the first synchronized dataset prior to the expiration time for the first synchronized dataset or the second synchronized dataset after the expiration time; and transmitting, to the online marketplace, an indication of the identified product category or data associated with the identified product category.

Aspect 4: The method of aspect 3, wherein the data indicates a sales tax rate for products categorized within the identified product category, a geo-location to which the online marketplace ships products categorized within the identified product category, a delivery estimate for products categorized within the identified product category, a shipping cost estimate for products categorized within the identified product category, or any combination thereof.

Aspect 5: The method of any of aspects 1 through 4, wherein the first synchronized dataset describes a product category tree having a first category structure for an online marketplace and the second synchronized dataset describes the product category tree having a second category structure that differs from the first category structure, the method further comprising: receiving a search query via an online marketplace; mapping one or more terms in the search query to one or more product categories of the product category tree using one of the first synchronized dataset prior to the expiration time of the first synchronized dataset or the second synchronized dataset after the expiration time; and returning an indication of one or more listings from the one or more product categories based at least in part on the one or more terms in the search query.

Aspect 6: The method of any of aspects 1 through 5, further comprising: periodically transmitting one or more additional queries requesting one or more additional synchronized datasets; and monitoring for one or more responses to the one or more additional queries.

Aspect 7: The method of any of aspects 1 through 6, wherein the first synchronized dataset describes a product category tree associated with an online marketplace and the second synchronized dataset describes a modified version of the product category tree.

Aspect 8: The method of any of aspects 1 through 7, wherein the first synchronized dataset describes online marketplace metadata associated with an online marketplace and the second synchronized dataset describes a modified version of the online marketplace metadata.

Aspect 9: The method of any of aspects 1 through 8, further comprising: synchronizing a clock of the first processing client with one or more additional clocks associated with one or more second processing clients of the plurality of processing clients.

Aspect 10: The method of any of aspects 1 through 9, wherein replacing the first synchronized dataset with the second synchronized dataset comprises: adjusting at least one pointer in memory implemented by a storage device from the first synchronized dataset to the second synchronized dataset.

Aspect 11: An apparatus for synchronized data replacement, comprising at least one processor; at least one memory coupled with the at least one processor; and instructions stored in the at least one memory and executable by the at least one processor to cause the apparatus to perform a method of any of aspects 1 through 10.

Aspect 12: An apparatus for synchronized data replacement, comprising at least one means for performing a method of any of aspects 1 through 10.

Aspect 13: A non-transitory computer-readable medium storing code for synchronized data replacement, the code comprising instructions executable by a processor to perform a method of any of aspects 1 through 10.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for synchronized data replacement, comprising:

receiving, by a first processing client from a data source, a dataset replacement indication that is distributed to a plurality of processing clients, the dataset replacement indication indicating an upcoming synchronized data replacement in which each processing client of the plurality of processing clients are to synchronously replace a first synchronized dataset with a second synchronized dataset and a request period during which each processing client of the plurality of processing clients are to request, at randomized times within the request period, the second synchronized dataset;

based at least in part on the dataset replacement indication and at a first randomized time within the request period, transmitting, by the first processing client to the data source, a query requesting the second synchronized dataset that is to replace the first synchronized dataset;

receiving, based at least in part on transmitting the query, a response from the data source comprising the second synchronized dataset and an indication of an expiration time for the first synchronized dataset, the expiration time indicating when the plurality of processing clients are to synchronously replace the first synchronized dataset with the second synchronized dataset;

storing, at the first processing client prior to the expiration time for the first synchronized dataset and based at least in part on receiving the response, the second synchronized dataset and the indication of the expiration time for the first synchronized dataset; and replacing, at the first processing client and in response to the expiration time for the first synchronized dataset occurring, the first synchronized dataset with the second synchronized dataset.

2. The method of claim 1, wherein the first synchronized dataset and the second synchronized dataset each describe a product category tree of an online marketplace and a plurality of sales tax rates for respective product categories of the product category tree, the method further comprising:

receiving an indication of a first product category within the product category tree of the online marketplace;

identifying a first sales tax rate for the first product category indicated by the first synchronized dataset prior to the expiration time for the first synchronized dataset or a second sales tax rate for the first product category indicated by the second synchronized dataset after the expiration time; and transmitting, to the online marketplace, an indication of one of the first sales tax rate or the second sales tax rate, or an indication of a calculated amount of sales tax for a purchase price of an item calculated using one of the first sales tax rate or the second sales tax rate.

3. The method of claim 1, wherein the first synchronized dataset describes a product category tree having a first category structure for an online marketplace and the second synchronized dataset describes the product category tree having a second category structure that differs from the first category structure, the method further comprising:

receiving an indication of a product available from the online marketplace;

identifying in which product category of a plurality of product categories of the product category tree the product is classified using one of the first synchronized dataset prior to the expiration time for the first synchronized dataset or the second synchronized dataset after the expiration time; and transmitting, to the online marketplace, an indication of the identified product category or data associated with the identified product category.

4. The method of claim 3, wherein the data indicates a sales tax rate for products categorized within the identified product category, a geo-location to which the online marketplace ships products categorized within the identified product category, a delivery estimate for products categorized within the identified product category, a shipping cost estimate for products categorized within the identified product category, or any combination thereof.

5. The method of claim 1, wherein the first synchronized dataset describes a product category tree having a first category structure for an online marketplace and the second synchronized dataset describes the product category tree having a second category structure that differs from the first category structure, the method further comprising:

receiving a search query via an online marketplace;

mapping one or more terms in the search query to one or more product categories of the product category tree using one of the first synchronized dataset prior to the expiration time of the first synchronized dataset or the second synchronized dataset after the expiration time; and returning an indication of one or more listings from the one or more product categories based at least in part on the one or more terms in the search query.

6. The method of claim 1, further comprising:

periodically transmitting one or more additional queries requesting one or more additional synchronized datasets; and monitoring for one or more responses to the one or more additional queries.

7. The method of claim 1, wherein the first synchronized dataset describes a product category tree associated with an online marketplace and the second synchronized dataset describes a modified version of the product category tree.

8. The method of claim 1, wherein the first synchronized dataset describes online marketplace metadata associated with an online marketplace and the second synchronized dataset describes a modified version of the online marketplace metadata.

9. The method of claim 1, further comprising:

synchronizing a clock of the first processing client with one or more additional clocks associated with one or more second processing clients of the plurality of processing clients.

10. The method of claim 1, wherein replacing the first synchronized dataset with the second synchronized dataset comprises:

adjusting at least one pointer in memory implemented by a storage device from the first synchronized dataset to the second synchronized dataset.

11. An apparatus for synchronized data replacement, comprising:

at least one processor;

at least one memory coupled with the at least one processor; and instructions stored in the at least one memory and executable by the at least one processor to cause the apparatus to perform operations comprising:

receiving, from a data source, a dataset replacement indication that is distributed to a plurality of processing clients, the dataset replacement indication indicating an upcoming synchronized data replacement in which each processing client of the plurality of processing clients are to synchronously replace a first synchronized dataset with a second synchronized dataset and a request period during which each processing client of the plurality of processing clients are to request, at randomized times within the request period, the second synchronized dataset;

based at least in part on the dataset replacement indication and at a first randomized time within the request period, transmitting, to the data source, a query requesting the second synchronized dataset that is to replace the first synchronized dataset;

receiving, based at least in part on transmitting the query, a response from the data source comprising the second synchronized dataset and an indication of an expiration time for the first synchronized dataset, the expiration time indicating when the plurality of processing clients are to synchronously replace the first synchronized dataset with the second synchronized dataset;

storing, at a first processing client prior to the expiration time for the first synchronized dataset and based at least in part on receiving the response, the second synchronized dataset and the indication of the expiration time for the first synchronized dataset; and replacing , at the first processing client and in response to the expiration time for the first synchronized dataset occurring, the first synchronized dataset with the second synchronized dataset.

12. The apparatus of claim 11, wherein the first synchronized dataset and the second synchronized dataset each describe a product category tree of an online marketplace and a plurality of sales tax rates for respective product categories of the product category tree, and the operations further comprise:

receiving an indication of a first product category within the product category tree of the online marketplace;

identifying a first sales tax rate for the first product category indicated by the first synchronized dataset prior to the expiration time for the first synchronized dataset or a second sales tax rate for the first product category indicated by the second synchronized dataset after the expiration time; and transmitting, to the online marketplace, an indication of one of the first sales tax rate or the second sales tax rate, or an indication of a calculated amount of sales tax for a purchase price of an item calculated using one of the first sales tax rate or the second sales tax rate.

13. The apparatus of claim 11, wherein the first synchronized dataset describes a product category tree having a first category structure for an online marketplace and the second synchronized dataset describes the product category tree having a second category structure that differs from the first category structure, and the operations further comprise:

receiving an indication of a product available from the online marketplace;

identifying in which product category of a plurality of product categories of the product category tree the product is classified using one of the first synchronized dataset prior to the expiration time for the first synchronized dataset or the second synchronized dataset after the expiration time; and transmitting, to the online marketplace, an indication of the identified product category or data associated with the identified product category.

14. The apparatus of claim 13, wherein the data indicates a sales tax rate for products categorized within the identified product category, a geo-location to which the online marketplace ships products categorized within the identified product category, a delivery estimate for products categorized within the identified product category, a shipping cost estimate for products categorized within the identified product category, or any combination thereof.

15. The apparatus of claim 11, wherein the first synchronized dataset describes a product category tree having a first category structure for an online marketplace and the second synchronized dataset describes the product category tree having a second category structure that differs from the first category structure, and the operations further comprise:

receiving a search query via an online marketplace;

mapping one or more terms in the search query to one or more product categories of the product category tree using one of the first synchronized dataset prior to the expiration time of the first synchronized dataset or the second synchronized dataset after the expiration time; and returning an indication of one or more listings from the one or more product categories based at least in part on the one or more terms in the search query.

16. The apparatus of claim 11, wherein the operations further -comprise:

periodically transmitting one or more additional queries requesting one or more additional synchronized datasets; and monitoring for one or more responses to the one or more additional queries.

17. The apparatus of claim 11, wherein the first synchronized dataset describes a product category tree associated with an online marketplace and the second synchronized dataset describes a modified version of the product category tree.

18. The apparatus of claim 11, wherein the first synchronized dataset describes online marketplace metadata associated with an online marketplace and the second synchronized dataset describes a modified version of the online marketplace metadata.

19. The apparatus of claim 11, wherein the operations further comprise:

synchronizing a clock of the first processing client with one or more additional clocks associated with one or more second processing clients of the plurality of processing clients.

20. A non-transitory computer-readable medium storing instructions that, when executable by at least one processor, causes the at least one processor to perform operations comprising:

receiving, from a data source, a dataset replacement indication that is distributed to a plurality of processing clients, the dataset replacement indication indicating an upcoming synchronized data replacement in which each processing client of the plurality of processing clients are to synchronously replace a first synchronized dataset with a second synchronized dataset and a request period during which each processing client of the plurality of processing clients are to request, at randomized times within the request period, the second synchronized dataset;

based at least in part on the dataset replacement indication and at a first randomized time within the request period, transmitting, to the data source, a query requesting the second synchronized dataset that is to replace the first synchronized dataset;

receiving, based at least in part on transmitting the query, a response from the data source comprising the second synchronized dataset and an indication of an expiration time for the first synchronized dataset, the expiration time indicating when the plurality of processing clients are to synchronously replace the first synchronized dataset with the second synchronized dataset;

storing, at a first processing client prior to the expiration time for the first synchronized dataset and based at least in part on receiving the response, the second synchronized dataset and the indication of the expiration time for the first synchronized dataset; and replacing, at the first processing client and in response to the expiration time for the first synchronized dataset occurring, the first synchronized dataset with the second synchronized dataset.

* * * * *